US012084302B2

(12) United States Patent
Kawamura

(10) Patent No.: US 12,084,302 B2
(45) Date of Patent: Sep. 10, 2024

(54) SHEET PROCESSING APPARATUS AND IMAGE FORMING SYSTEM

(71) Applicant: CANON KABUSHIKI KAISHA, Tokyo (JP)

(72) Inventor: Koji Kawamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/305,444

(22) Filed: Apr. 24, 2023

(65) Prior Publication Data

US 2023/0348222 A1 Nov. 2, 2023

(30) Foreign Application Priority Data

Apr. 28, 2022 (JP) ................................ 2022-075406

(51) Int. Cl.

*B65H 37/04* (2006.01)
*B42C 1/12* (2006.01)
*B65H 9/04* (2006.01)
*B65H 29/60* (2006.01)
*B65H 37/02* (2006.01)

(52) U.S. Cl.

CPC ............... *B65H 37/04* (2013.01); *B42C 1/12* (2013.01); *B65H 9/04* (2013.01); *B65H 29/60* (2013.01); *B65H 37/02* (2013.01); *B65H 2301/1511* (2013.01); *B65H 2301/163* (2013.01); *B65H 2301/43822* (2013.01); *B65H 2404/14* (2013.01); *B65H 2513/42* (2013.01); *B65H 2801/27* (2013.01)

(58) Field of Classification Search

CPC .......... B65H 37/02; B65H 37/04; B65H 9/04; B65H 29/60; B65H 2301/1511; B65H 2301/163; B65H 2301/43828; B65H 2404/14; B65H 2513/42; B65H 2801/27; B42C 1/12

USPC ........ 270/58.07, 58.08; 412/8, 33, 900, 901, 412/902

See application file for complete search history.

(56) References Cited

U.S. PATENT DOCUMENTS 5,938,192 A * 8/1999 Kosasa ..................... B42C 1/12 271/223
7,207,557 B2 * 4/2007 Kaneko .................. B65H 37/00 270/58.1

(Continued)

FOREIGN PATENT DOCUMENTS

JP 2004-209858 A 7/2004
JP 2005-169629 A 6/2005

(Continued)

*Primary Examiner* — Leslie A Nicholson, III
(74) *Attorney, Agent, or Firm* — Venable LLP

(57) ABSTRACT

A sheet processing apparatus includes a stacking unit configured to stack a plurality of sheets, an alignment unit including a supporting portion on which the sheets are loaded, the alignment unit being configured to align positions of the sheets loaded on the supporting portion, and a bonding unit configured to bond the sheets loaded on the supporting portion to each other. The alignment unit is configured to align a position of the second sheet stack with the first sheet stack. The bonding unit is configured to heat and pressurize the second sheet stack aligned by the alignment unit such that sheets of the second sheet stack are bonded to each other with the adhesive and the first sheet stack and the second sheet stack are bonded to each other with the adhesive.

18 Claims, 13 Drawing Sheets

(56) References Cited

U.S. PATENT DOCUMENTS

| | | | | |
|---|---|---|---|---|
| 8,838,014 | B2 * | 9/2014 | Matsue | G03G 15/6544 399/408 |
| 8,840,099 | B2 * | 9/2014 | Masunari | B31F 5/06 412/37 |
| 9,110,425 | B2 * | 8/2015 | Watanabe | G03G 15/6544 |
| 9,962,986 | B2 * | 5/2018 | Terao | B65H 37/02 |
| 2017/0087795 | A1 * | 3/2017 | Ishihara | B65H 31/3081 |
| 2017/0097603 | A1 * | 4/2017 | Ishihara | B65H 39/10 |

FOREIGN PATENT DOCUMENTS

| | | | |
|---|---|---|---|
| JP | 2005-219849 | A | 8/2005 |
| JP | 2016-037345 | A | 3/2016 |

* cited by examiner

S2:STOP FIG.4F

SHEET PROCESSING APPARATUS AND IMAGE FORMING SYSTEM

BACKGROUND OF THE INVENTION

Field of the Invention

The present invention relates to a sheet processing apparatus that processes a sheet, and an image forming system that forms an image on a sheet.

Description of the Related Art

Japanese Patent Laid-Open No. JP 2004-209858 A discloses an image forming apparatus that forms toner images on sheets and applies an adhesive toner thereto before superposing the sheets and using a heating-pressurizing member to heat and pressurize the sheets to produce a product obtained by bonding the sheets.

In the configuration of the above document, a sheet alignment is performed every time sheets to which the adhesive toner has been applied are loaded one by one into a supporting tray. For this reason, the alignment of a newly loaded sheet was likely to be hindered by the adhesive force of the adhesive toner of the already loaded sheets or the adhesive toner of the newly loaded sheet, thus reducing the alignment.

SUMMARY OF THE INVENTION

The present invention provides a configuration that can improve alignment of sheets to be bonded.

According to one aspect of the invention, a sheet processing apparatus includes a stacking unit configured to stack a plurality of sheets which are conveyed one by one in a state where an adhesive is applied thereto, an alignment unit including a supporting portion on which the sheets are loaded, the alignment unit being configured to align positions of the sheets loaded on the supporting portion, and a bonding unit configured to bond the sheets loaded on the supporting portion to each other, wherein after a first sheet stack is loaded on the supporting portion and aligned by the alignment unit and then a second sheet stack stacked in advance in the stacking unit is loaded on the first sheet stack, the alignment unit is configured to align a position of the second sheet stack with the first sheet stack, and wherein the bonding unit is configured to heat and pressurize the second sheet stack aligned by the alignment unit such that sheets of the second sheet stack are bonded to each other with the adhesive and the first sheet stack and the second sheet stack are bonded to each other with the adhesive.

Further features of the present invention will become apparent from the following description of exemplary embodiments with reference to the attached drawings.

BRIEF DESCRIPTION OF THE DRAWINGS

FIGS. 4A to 4H are diagrams to illustrate a buffer operation according to the embodiment.

DESCRIPTION OF THE EMBODIMENTS

Embodiments according to the present disclosure will be described hereinbelow with reference to the drawings.

Figure 1:
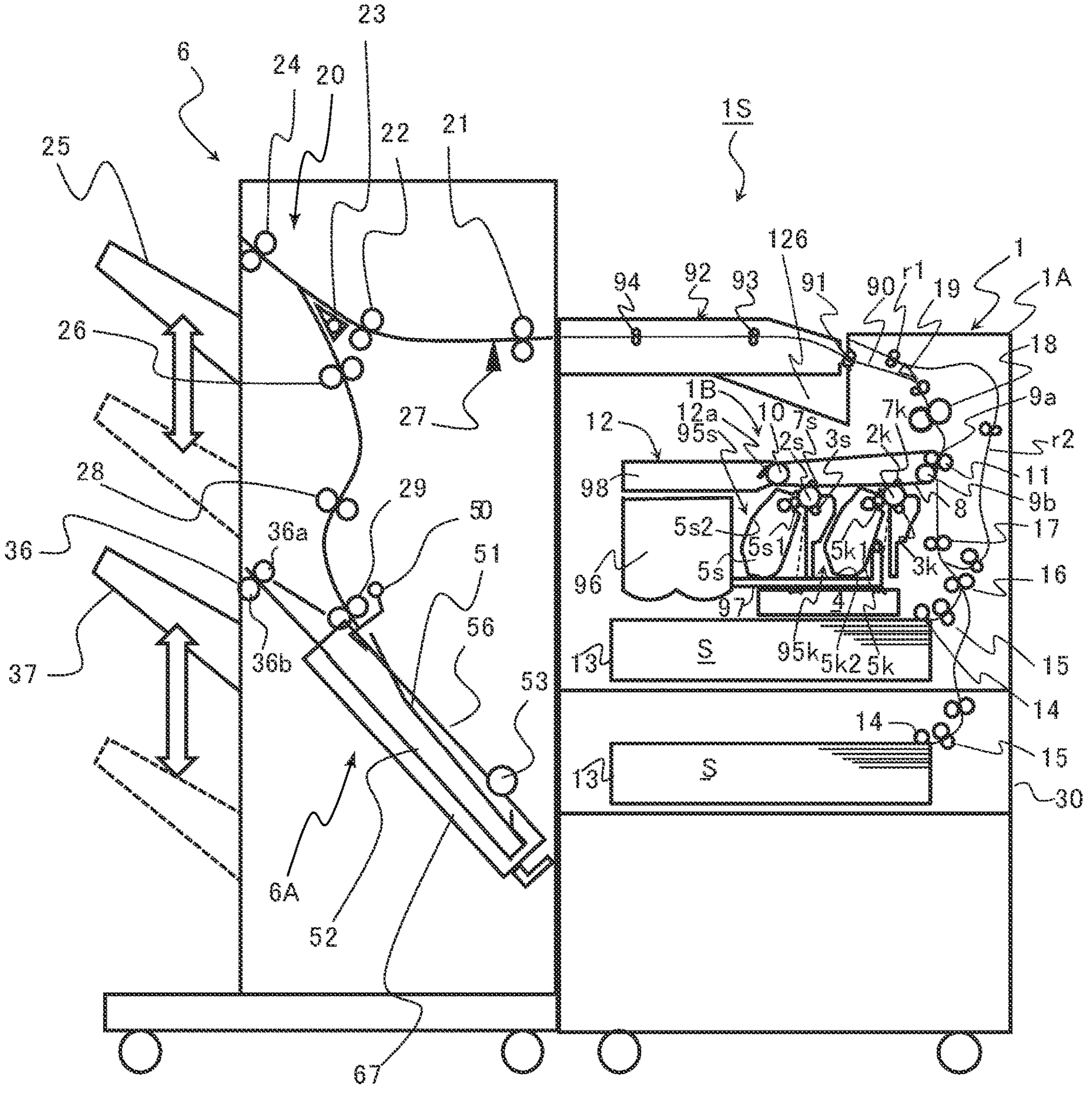
FIG. 1 is a schematic diagram of an image forming system according to an embodiment.

FIG. 1 is a schematic diagram of an image forming system 1S according to an embodiment. The image forming system 1S includes an image forming apparatus 1 and a post-processing apparatus 6. The image forming system 1S uses the image forming apparatus 1 to form an image on a sheet S serving as a recording material, and outputs, as a product, a product processed by the post-processing apparatus 6 serving as a sheet processing apparatus, as necessary. Note that various sheet materials having different sizes and materials can be used as the sheet S, such as paper including plain paper and thick paper, a plastic film, cloth, a sheet material subjected to surface processing such as coated paper, or a sheet material having a special shape such as an envelope or index paper.

Image Forming Apparatus

The image forming apparatus 1 is an electrophotographic apparatus that includes, inside an apparatus body 1A, an electrophotographic-type image forming unit 1B. The image forming unit 1B includes an intermediate transfer belt 8 as an intermediate transfer member, and process cartridges 95*s* and 95*k* arranged along the intermediate transfer belt 8. Each of the process cartridges 95*s* and 95*k* includes a photosensitive drum 2*s* or 2*k* serving as an image bearing member (electrophotographic photosensitive member), a charging unit 3*s* or 3*k*, and a developing unit 5*s* or 5*k*, and is detachable from the apparatus body 1A. The developing units 5*s* and 5*k* have containers 5*s*2 and 5*k*2 that store toner, which is a developer or developing agent, and developing rollers 5*s*1 and 5*k*1, which are rotatably held by the containers and serve as developer bearing members for rotating while carrying the toner.

The process cartridge 95*k* is a first process unit that creates a toner image by using a first toner. The process cartridge 95*s* is a second process unit that creates a toner image by using a second toner. Note that the "apparatus body 1A" of the image forming apparatus 1 refers to a portion obtained by excluding the process cartridges 95*s* and 95*k* and the toner cartridge 96 from the image forming apparatus 1.

The process cartridge 95*k* uses a black toner to create a toner image for recording an image on the sheet S. The process cartridge 95*s* creates a toner image of a transparent toner (hereinafter referred to as the adhesive toner), which is a powder adhesive, in order to apply the adhesive toner to the sheet S. That is, in the present embodiment, the black toner is used as the first toner, and the adhesive toner is used as the second toner. The image forming unit 1B including the process cartridge 95*s* is an application unit that applies a powder adhesive to the sheet S. The image forming unit 1B including the process cartridge 95*k* is also an image forming unit that forms an image on the sheet S by using a color toner.

In the present embodiment, a transparent toner is used as the adhesive toner stored in the process cartridge 95*s*; however, a colored toner, for example, may be used as the powder adhesive. Furthermore, because the toner image of the adhesive toner is transparent, the toner image is different from a normal toner image for recording an image on the sheet S. However, unless otherwise specified, the "toner image" in the following description includes the toner image of the adhesive toner.

A toner cartridge 96 containing a black toner to be supplied to the process cartridge 95*k* is detachably mounted in the apparatus body 1A, and is connected to the process cartridge 95*k* via a toner conveyance pipe 97.

A scanner unit 4 serving as an exposure unit is disposed below the process cartridges 95*s* and 95*k* in the apparatus body 1A. Below the scanner unit 4, a cassette 13 (also referred to as the sheet tray or storage), in which sheets S for use in image formation are loaded, is inserted into the apparatus body 1A so as to be withdrawable. An optional sheet feeding apparatus 30 including the cassette 13 can also be connected below the apparatus body 1A.

The intermediate transfer belt 8 is a movable (rotatable) endless belt stretched around a drive roller 9*a*, a stretching roller 9*b*, and a tension roller 10 that rotate about mutually parallel axes, and is moved (rotated, conveyed) counter-clockwise in the drawing by the rotation of the drive roller 9*a*. On the inner peripheral side of the intermediate transfer belt 8, primary transfer rollers 7*k* and 7*s* serving as primary transfer members are arranged in positions facing the photosensitive drums 2*k* and 2*s* via the intermediate transfer belt 8, respectively. A secondary transfer roller 11 serving as a transfer member (a secondary transfer member) is provided on the outer peripheral side of the intermediate transfer belt 8 in a position facing the drive roller 9 via the intermediate transfer belt 8. A secondary transfer unit serving as a transfer unit is formed as a nip portion between the intermediate transfer belt 8 and the secondary transfer roller 11. The intermediate transfer belt 8, the primary transfer rollers 7*k* and 7*s*, and the secondary transfer roller 11 constitute a transfer unit for transferring the toner images formed on the photosensitive drums 2*k* and 2*s*, which are image bearing members, onto the sheet S.

A belt cleaner 12 serving as a cleaning unit for cleaning the intermediate transfer belt 8 is provided in a position facing the tension roller 10 via the intermediate transfer belt 8. The belt cleaner 12 includes a cleaning member 12*a* such as a blade or a brush that is disposed in contact with the intermediate transfer belt 8 and that removes attached matter such as transfer residual toner from the intermediate transfer belt 8, and a waste toner container 98 serving as a collection container that collects the attached matter removed by the cleaning member 12*a*.

A fixing unit 18 serving as a fixing portion is disposed above the secondary transfer unit in the apparatus body 1A. The fixing unit 18 has a configuration of a heat fixing system that fixes a toner image by heating, and includes, for example, a fixing roller and a pressure roller that nip and convey a sheet S, and a heat source (for example, a halogen lamp) that heats a toner image on the sheet S via the fixing roller.

Image Forming Operation

In a case where the image forming apparatus 1 executes an image forming operation, the sheets S are fed from a cassette 13 in the lower portion of the apparatus body 1A or a cassette 13 in the sheet feeding apparatus 30 by a feed roller 14 serving as a feeding unit, and are separated and conveyed one by one by a pair of separation rollers 15. The separated sheet S is conveyed toward a registration roller pair 17 by a drawing roller 16, and the leading edge of the sheet S abuts against the nip portion of the registration roller pair 17 in a stopped state, thereby correcting skew feeding of the sheet S. The registration roller pair 17 sends the sheet S to the secondary transfer unit at a timing synchronized with the progress of the toner image creation process by the image forming unit 1B.

Meanwhile, in the image forming unit 1B, the photosensitive drums 2*s* and 2*k* rotate, and the charging units 3*s* and 3*k* uniformly charge the surfaces of the photosensitive drums 2*s* and 2*k*. Based on image information representing an image to be recorded on the sheet S, the scanner unit 4 irradiates the photosensitive drum 2*k* with laser light to write an electrostatic latent image. The electrostatic latent image is visualized as a black toner image due to the developing unit 5*k* performing development by using black toner. In a case where the post-processing apparatus 6 performs the bonding processing described below, the scanner unit 4 irradiates the photosensitive drum 2*s* with laser light based on information indicating the bonding position of the sheets S, thereby writing an electrostatic latent image. As a result of the developing unit 5*s* developing the electrostatic latent image by using the adhesive toner, a toner image of the adhesive toner is formed in a region on the photosensitive drum 2*s* corresponding to the bonding position on the sheet S.

The toner images formed on the photosensitive drums 2*s* and 2*k* are transferred (primary transfer) to the intermediate transfer belt 8 by the primary transfer rollers 7*s* and 7*k*, and are conveyed toward the secondary transfer unit by the rotation of the intermediate transfer belt 8. Further, in the secondary transfer unit, a voltage is applied to the secondary transfer roller 11, and thus the toner image is transferred (secondary transfer) to the sheet S fed from the registration roller pair 17. The sheet S, having passed through the secondary transfer unit, is fed to the fixing unit 18, and the toner image is heated and pressurized while passing through the nip portion between the fixing roller and the pressure roller, whereby the toner image is fixed to the sheet S.

The conveyance path of the sheet S, having passed through the fixing unit 18, is switched by a switching unit 19. In the case of simplex printing, the sheet S is guided to the discharge path 90 by the switching unit 19, and is discharged from the apparatus body 1A by a sheet discharge roller pair 91. In the present embodiment, the image forming apparatus 1 is coupled to the post-processing apparatus 6 via a relay conveyance unit 92, and the sheet S discharged from the sheet discharge roller pair 91 is delivered to the post-processing apparatus 6 via conveyance roller pairs 93 and 94 of the relay conveyance unit 92. Further, in a case where the relay conveyance unit 92 and the post-processing apparatus 6 are not connected, the sheet discharge roller pair 91 discharges the sheets S as a product onto a supporting tray 126 provided in the upper portion of the apparatus body 1A.

In the case of duplex printing (duplex image formation), the sheet S, which has an image formed on a first surface thereof, is guided to the reverse conveyance roller pair r1 by the switching unit 19, reverse-conveyed (switchback-conveyed) by the reverse conveyance roller pair r1, and then conveyed toward the registration roller pair 17 via the duplex conveyance path r2. Further, after an image is formed on the second surface opposite to the first surface while the sheet passes through the secondary transfer unit and the fixing unit 18, the sheet S is discharged from the apparatus body 1A by the sheet discharge roller pair 91. Therefore, in the present embodiment, the adhesive toner can be applied to both the first surface and the second surface of the sheet S.

Figure 2:
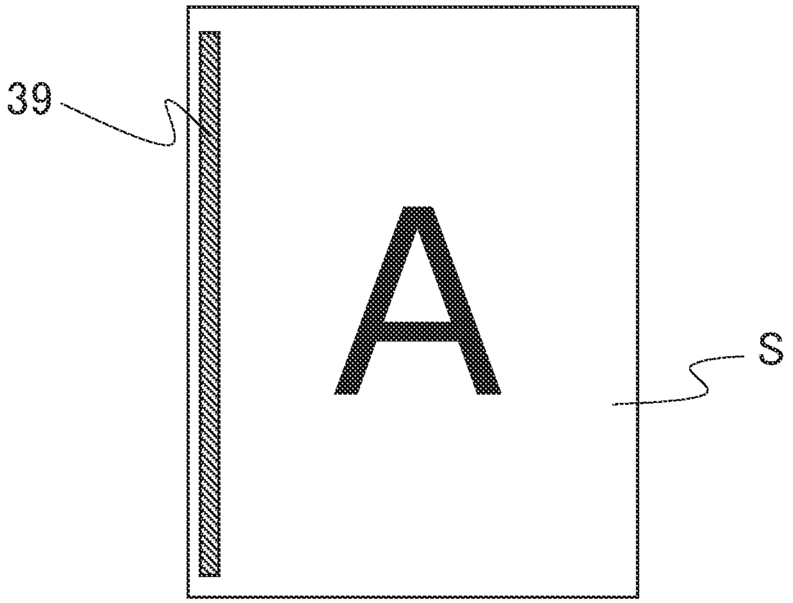
FIG. 2 is a diagram illustrating an example of an application region of an adhesive toner according to the embodiment.

FIG. 2 is a diagram illustrating an example of an application region of the adhesive toner on the sheet (the bonding range for bonding processing). Formed on the sheet S are a toner image (alphabet "A") of the black toner created by the process cartridge 95*k* and an adhesive toner layer 39 created by the process cartridge 95*s*.

In the case of a simplex printing booklet, the adhesive toner layer 39 is formed on only one side of the sheet S. In the case of a duplex printing booklet, an adhesive toner layer 39 may be formed on only one side of the sheet S, or may be formed on both sides of the sheet S. In addition, although an application region is illustrated here in a case where a long side binding booklet, which is to be bound along the long side of the sheets S, is created, corner binding can also be performed by applying adhesive toner to the corner portions of the sheet S, for example.

Post-Processing Apparatus

As shown in FIG. 1, the post-processing apparatus 6 has a buffer unit 20 serving as a stacking unit for stacking a plurality of sheets S, an alignment unit 56 serving as an alignment unit for aligning the plurality of sheets S, and a heating and pressurizing unit 67 serving as a bonding unit for performing bonding processing on the sheets S. The post-processing apparatus 6 is a sheet processing apparatus configured to create a sheet bundle (a booklet) by performing bonding processing on a plurality of sheets S on which images have been formed by the image forming apparatus 1. Further, the post-processing apparatus 6 is also capable, without performing bonding processing of sheets S whereon images has been formed by the image forming apparatus 1, of discharging the sheets S to an upper discharge tray 25 or a lower discharge tray 37. The upper discharge tray 25 and the lower discharge tray 37 are controlled to ascend and descend in accordance with the loaded quantity of sheets. The buffer unit 20, the alignment unit 56, and the heating and pressurizing unit 67 will be described in detail below.

The post-processing apparatus 6 includes, as conveyance members for conveying the sheets S, an inlet roller 21, a pre-buffer roller 22, a reverse conveyance roller 24, an inner discharge roller 26, an intermediate conveyance roller 28, a kick-out roller 29, and a bundle discharge roller 36. The inlet roller 21, the pre-buffer roller 22, and the reverse conveyance roller 24 are disposed on a conveyance path toward the upper discharge tray 25 from a receiving port for receiving the sheets S from the image forming apparatus 1. The inner discharge roller 26, the intermediate conveyance roller 28, and the kick-out roller 29 are arranged on a conveyance path that branches at a position between the pre-buffer roller 22 and the reverse conveyance roller 24 and that extends toward the alignment unit 56. The bundle discharge roller 36 is arranged on a conveyance path from the alignment unit 56 toward the lower discharge tray 37.

In the post-processing apparatus 6, a sheet S received from the image forming apparatus 1 can be conveyed at a higher conveyance speed than a conveyance speed (i.e., process speed during image formation) of the sheet S in the image forming apparatus 1 (and the relay conveyance unit 92). Specifically, for example, the sheet S is conveyed at the same speed as the image forming apparatus 1 until the trailing edge of the sheet S passes through the inlet roller 21, and the pre-buffer roller 22 is accelerated after the trailing edge of the sheet S passes through the inlet roller 21. Each roller after the pre-buffer roller 22 also conveys the sheet at substantially the same speed as the pre-buffer roller 22 after acceleration. The passage of the trailing edge of the sheet S can also be detected by an inlet sensor 27 described below. As a result, the post-processing apparatus 6 is capable of processing the sheet S without reducing the productivity of the image forming apparatus 1, and the productivity of the image forming system 1S is improved.

Buffer Unit

Figure 3:
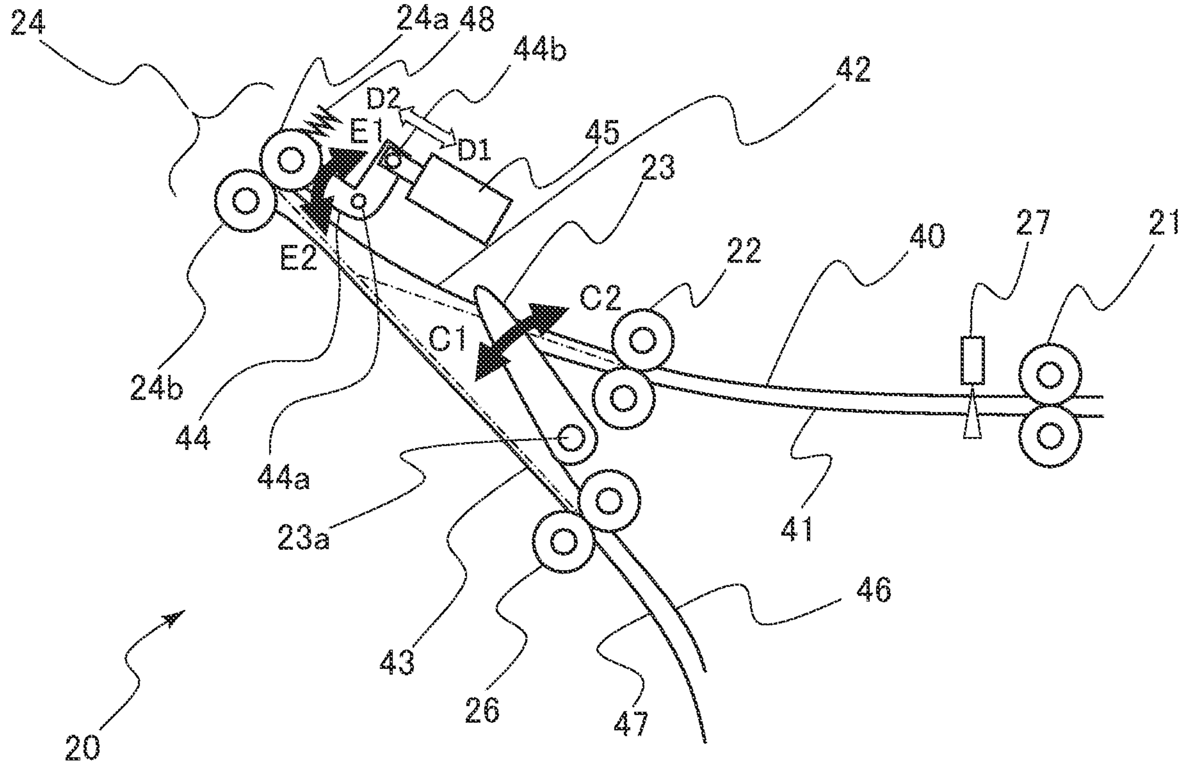
FIG. 3 is a schematic diagram of a buffer unit according to the embodiment.

Next, the buffer unit 20 will be described in detail using FIGS. 3 and 4A to 4H. FIG. 3 is a schematic diagram of the buffer unit 20. FIGS. 4A to 4H are diagrams illustrating an operation (hereinafter referred to as a buffer operation) in which the buffer unit 20 stacks a plurality of sheets.

As illustrated in FIG. 3, the post-processing apparatus 6 includes an upper inlet guide 40 and a lower inlet guide 41 that guide the sheet between the inlet roller 21 and the pre-buffer roller 22, and an inlet sensor 27 that detects the sheet S at a position between the inlet roller 21 and the pre-buffer roller 22. The inlet sensor 27 is disposed on the upper inlet guide 40. The inlet sensor 27 is, for example, a reflective photosensor that emits infrared light toward a space in the conveyance path and outputs a signal corresponding to the presence or absence of reflected light from a sheet passing through the conveyance path. The lower inlet guide 41 facing the inlet sensor 27 is provided with, for example, a hole having a spot diameter of the inlet sensor 27 or more so that infrared light is not reflected in a state where the sheet does not pass along the conveyance path.

The buffer unit 20 according to the present embodiment includes the pre-buffer roller 22 as a first roller pair, a reverse conveyance roller 24 as a second roller pair, and an inner discharge roller 26 as a third roller pair.

The inner discharge roller 26 is disposed on a conveyance path that branches from a conveyance path extending from the pre-buffer roller 22 toward the reverse conveyance roller 24, and that extends toward the binding processing unit 6A (alignment unit 56) (see FIG. 1). The reverse conveyance roller 24 and the inner discharge roller 26 are each driven by a motor that is configured to reverse the rotation direction. That is, the reverse conveyance roller 24 and the inner discharge roller 26 are configured to convey the sheet in the direction from the reverse conveyance roller 24 toward the alignment unit 56 and in the opposite direction. The buffer unit 20 forms a sheet stack by stacking a succeeding sheet, which is being conveyed via the pre-buffer roller 22, on a preceding sheet or a stack of preceding sheets at the reverse conveyance roller 24 while the preceding sheet (stack) is moved back and forth (reciprocally) by the reverse conveyance roller 24 and the inner discharge roller 26. The detailed operation of the buffer unit will be described hereinbelow.

The post-processing apparatus 6 includes an upper reverse conveyance guide 42 that guides the sheet between the pre-buffer roller 22 and the reverse conveyance roller 24, and a lower reverse conveyance guide 43 that guides the sheet between the reverse conveyance roller 24 and the inner discharge roller 26. The post-processing apparatus 6 further includes an upper inner discharge guide 46 and a lower inner discharge guide 47 that guide the sheet downstream of the inner discharge roller 26.

A backflow prevention guide 23 is disposed downstream of the pre-buffer roller 22. The backflow prevention guide 23 is rotatably supported by the upper inner discharge guide 46 on the rotation shaft 23*a*, and is movable to a position in which a conveyance path connecting the pre-buffer roller 22 and the reverse conveyance roller 24 is open and a position in which the conveyance path is closed. The backflow prevention guide 23 is constantly biased by a spring (not illustrated) in the C2 direction, which is a direction toward the position in which the conveyance path is closed. The distal end of the backflow prevention guide 23 is formed in a comb-teeth shape so as to overlap the upper reverse conveyance guide 42 when viewed in the rotation axis direction (sheet width direction) of the pre-buffer roller 22.

The backflow prevention guide 23 rotates in the direction C1 to allow the passage of the sheet S when the sheet S is fed from the pre-buffer roller 22. In addition, the backflow prevention guide 23 rotates in the C2 direction and returns to the original position when the trailing edge of the sheet S passes, and restricts the backflow of the sheet S toward the pre-buffer roller 22. Note that the backflow prevention guide 23 may be biased by its own weight, for example, instead of having a configuration which is biased by a spring.

The reverse conveyance roller 24 is a roller pair including an upper reverse conveyance roller 24*a* and a lower reverse conveyance roller 24*b*. In the present embodiment, the driving force is supplied to both the upper reverse conveyance roller 24*a* and the lower reverse conveyance roller 24*b*. Further, the rotations of the upper reverse conveyance roller 24*a* and the lower reverse conveyance roller 24*b* are always synchronized. A separation lever 44 is connected to the upper reverse conveyance roller 24*a*. A lever fulcrum shaft 44*a* of the separation lever 44 is rotatably supported by the upper reverse conveyance guide 42, and is rotatably connected to a plunger solenoid 45 using a solenoid connection shaft 44*b*.

When the plunger solenoid 45 is energized, the core moves in direction D1 in the drawing, and the separation lever 44 rotates in direction E1 in the drawing. As a result, the reverse conveyance roller 24 becomes a separated state in which the upper reverse conveyance roller 24*a* and the lower reverse conveyance roller 24*b* are separate (a state in which the nip of the roller pair is open). When the energization of the plunger solenoid 45 is stopped, the upper reverse conveyance roller 24*a* moves in direction E2 in the drawing under the biasing force of a pressure spring 48, and the plunger solenoid 45 moves in direction D2 in the drawing. As a result, the reverse conveyance roller 24 becomes a contact state where the upper reverse conveyance roller 24*a* and the lower reverse conveyance roller 24*b* are brought into contact with each other (a state where the sheet can be nipped in the nip between the pair of rollers).

Buffer Operation

Next, the buffer operation of the buffer unit 20 will be described in detail using FIGS. 4A to 4H. The sheets S conveyed to the post-processing apparatus 6 will be described as S1, S2, and S3 in that order. Here, an operation for stacking two sheets S1 and S2 will be described as an example. Further, the conveyance speed of the inlet roller 21 is V1. The conveyance speed of the pre-buffer roller 22, the reverse conveyance roller 24, and the inner discharge roller 26 (the conveyance speed after acceleration in the post-processing apparatus 6) is V2.

Unless otherwise specified, the "leading edge" of the sheet represents the leading edge (the downstream edge in the conveyance direction) of the sheet in the current conveyance direction of the sheet, and the "trailing edge" of the sheet represents the trailing edge (the upstream edge in the conveyance direction) of the sheet in the current conveyance direction of the sheet.

Figure 4A:
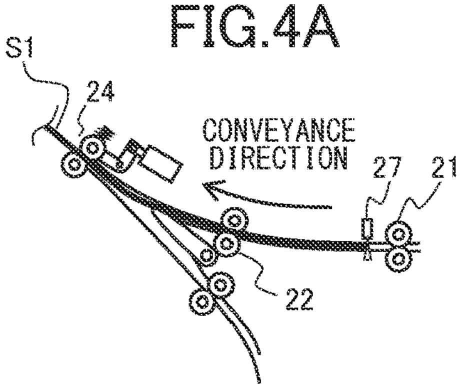

As illustrated in FIG. 4A, the trailing edge of the first sheet S1 (preceding sheet) passes through the inlet sensor 27. At this timing, the pre-buffer roller 22 and the reverse conveyance roller 24 cause the sheet S1 to accelerate from speed V1 to speed V2. As a result, an interval for performing the switchback described below is secured between the sheet S1 and a succeeding second sheet S2 (a succeeding sheet) that is being conveyed from the image forming apparatus 1.

Figure 4B:
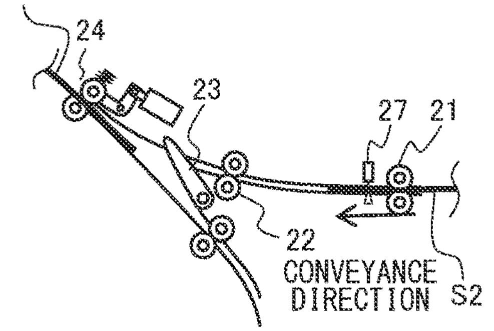

As illustrated in FIG. 4B, the reverse conveyance roller 24 temporarily stops the sheet S1 in a position in which the sheet passes through the backflow prevention guide 23.

Figure 4C:
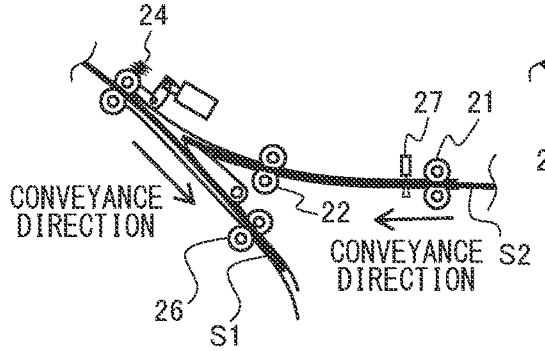

As illustrated in FIG. 4C, the reverse conveyance roller 24 reverses the rotation direction after a temporary stop, and conveys the sheet S1 toward the inner discharge roller 26.

Figure 4D:
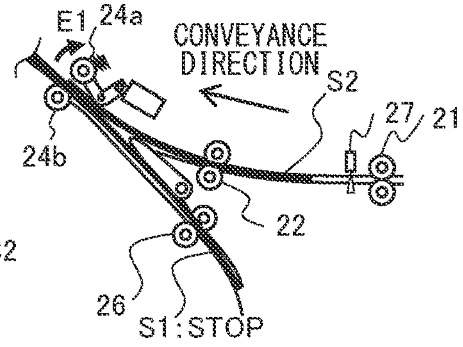

As illustrated in FIG. 4D, the conveyance of the sheet S1 is stopped by the reverse conveyance roller 24 and the inner discharge roller 26 in a position in which the leading edge of the sheet S1 is conveyed by a predetermined amount from the inner discharge roller 26. Further, after the sheet S1 is nipped by the inner discharge roller 26, the upper reverse conveyance roller 24*a* is moved in direction E1, and the reverse conveyance roller 24 becomes the separated state.

The second sheet S2 is conveyed toward the reverse conveyance roller 24 so as to pass the first sheet S1. The sheet S2 is then conveyed through the space between the upper reverse conveyance roller 24*a* and the lower reverse conveyance roller 24*b* of the reverse conveyance roller 24 in the separated state. Note that the trailing edge of the succeeding sheet S2 is accelerated after passing through the inlet sensor 27.

Figure 4E:
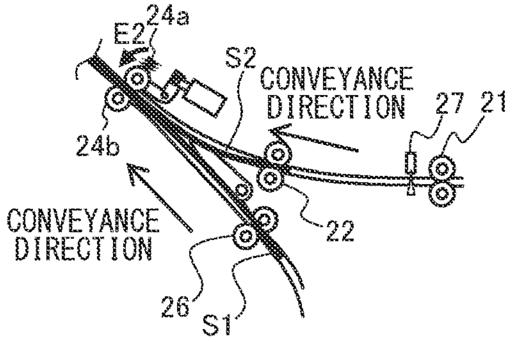
Figure 4E:
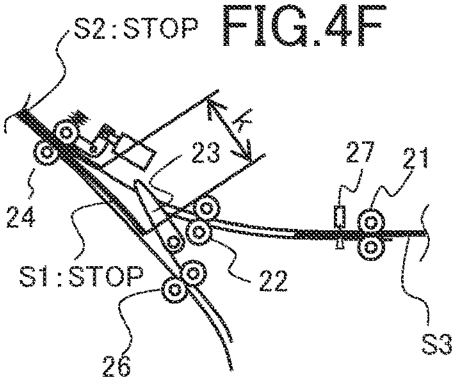

As illustrated in FIG. 4E, the inner discharge roller 26 conveys the first sheet S1 toward the reverse conveyance roller 24 based on the conveyance timing of the second sheet S2. The conveyance timing is determined based on the elapsed time after the trailing edge of the sheet S2 passes through the inlet sensor 27. The upper reverse conveyance roller 24*a* is then moved in direction E2 at the timing when the conveyance speeds of the first sheet S1 and the second sheet S2 become equal (the relative speed is substantially zero). As a result, the sheet stack including the two sheets S1 and S2 is nipped by the reverse conveyance roller 24 which is in the contact state. Note that the reverse conveyance roller 24 is drive-controlled so as to have the same speed V2 as the conveyance speed of the sheets S1 and S2 before becoming the contact state.

As illustrated in FIG. 4F, after the trailing edge of the sheet S2 passes through the backflow prevention guide 23, the reverse conveyance roller 24 temporarily stops again. Here, the conveyance timing is set such that the trailing edge of the sheet S1 (the leading edge in a case where the conveyance direction toward the alignment unit 56 is taken as a reference) protrudes from the trailing edge of the sheet S2 toward the inner discharge roller 26 by a predetermined amount k. In other words, the buffer unit 20 stacks the sheets in a shifting manner such that a lower sheet protrudes further toward the longitudinal reference plate 54 described below than an upper sheet. Here, the lower sheet refers to a sheet which is among the plurality of sheets stacked by the buffer operation and which is positioned below another sheet (the upper sheet) among the plurality of sheets stacked by the buffer operation in a state of being loaded in the alignment unit 56. Advantages of the sheet stacking in the shifting manner and the magnitude of the predetermined amount k will be described below.

Figure 4G:
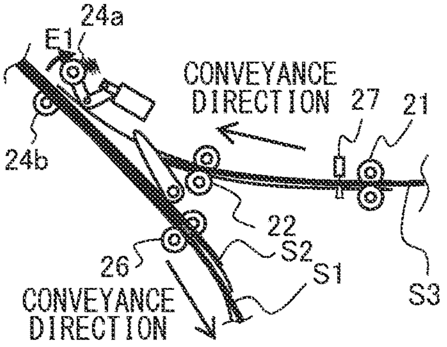

As illustrated in FIG. 4G, the reverse conveyance roller 24 reverses the rotation direction after a temporary stop, and conveys the sheets S1 and S2 toward the inner discharge roller 26. In the illustrated example, the two sheets S1 and S2 are conveyed downstream from the inner discharge roller 26 without being subject to a further processing. After the sheets S1 and S2 are nipped by the inner discharge roller 26, the upper reverse conveyance roller 24*a* is moved in direction E1, and the reverse conveyance roller 24 becomes the separated state. As a result, the reverse conveyance roller 24 is ready to receive the succeeding sheet S3.

Figure 4H:
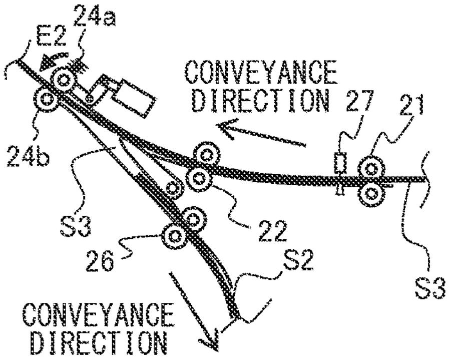

As illustrated in FIG. 4H, after the trailing edges of the sheets S1 and S2 pass through the reverse conveyance roller 24, the upper reverse conveyance roller 24*a* is moved in direction E2, and the reverse conveyance roller 24 becomes the contact state. Accordingly, the reverse conveyance roller 24 nips the sheet S3 (the first sheet in buffer processing subsequent to sheets S1 and S2). Thereafter, as per FIG. 4C, the reverse conveyance roller 24 reverses the rotation direction after the temporary stop, and conveys the sheet S3 toward the inner discharge roller 26.

By repeatedly executing the operations of FIGS. 4C to 4H, the buffer unit 20 is capable of performing stacking processing (a buffer operation) to stack every two sheets in advance.

In a case where three or more sheets are stacked by the buffer operation, the reverse conveyance roller 24 conveys the sheets S1 and S2 from the state of FIG. 4F toward the inner discharge roller 26 (corresponds to FIG. 4C). The conveyance of the sheets S1 and S2 (preceding sheet stack) is stopped in a position in which the leading edge of the sheet S2 is conveyed by a predetermined amount from the inner discharge roller 26 (corresponds to FIG. 4D). Based on the conveyance timing of the succeeding sheet, the inner discharge roller 26 conveys the preceding sheet stack toward the reverse conveyance roller 24 (corresponds to FIG. 4E). After the trailing edge of the succeeding sheet passes through the backflow prevention guide 23, the reverse conveyance roller 24 temporarily stops again (corresponds to FIG. 4F). That is, the sheet S1 and the sheet S2 in FIGS. 4C to 4F may be read as "already stacked sheet stack" and "succeeding sheet", respectively.

In this manner, by repeatedly performing the operations of FIGS. 4C to 4F, succeeding sheets can be added one by one to the sheet stack while moving the sheet stack back and forth between the reverse conveyance roller 24 and the inner discharge roller 26. As a result, the buffer unit 20 is capable of performing stacking processing (a buffer operation) to stack three or more sheets. In addition, between two adjacent sheets among three or more sheets, the lower sheet can be made to protrude by a predetermined amount k relative to the upper sheet.

In the configuration example according to the present embodiment, stacking processing (a buffer operation) to stack a maximum of five sheets can be performed. Further, according to the present embodiment, because the sheets are stacked by taking, as a reference, the sheet edge position, the sheets can be stacked using substantially the same operation even if the length of the sheets in the conveyance direction varies.

The plurality of sheets stacked in advance by the buffer unit 20 is conveyed via the inner discharge roller 26, the intermediate conveyance roller 28, and the kick-out roller 29, and is loaded into the alignment unit 56 (FIG. 1).

Alignment Unit

Figure 5:
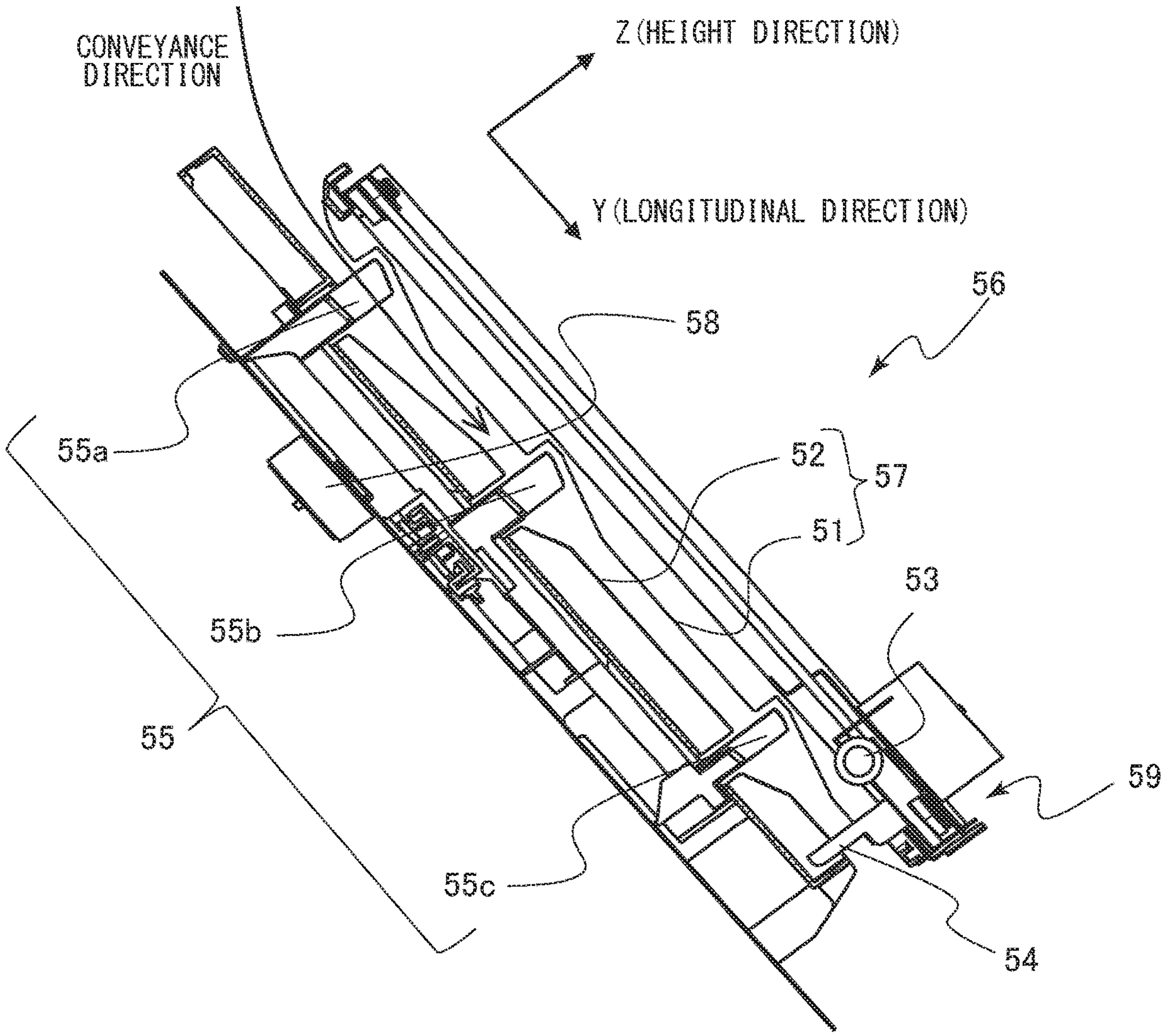
FIG. 5 is a cross-sectional view of an alignment unit according to the embodiment.
Figure 6:
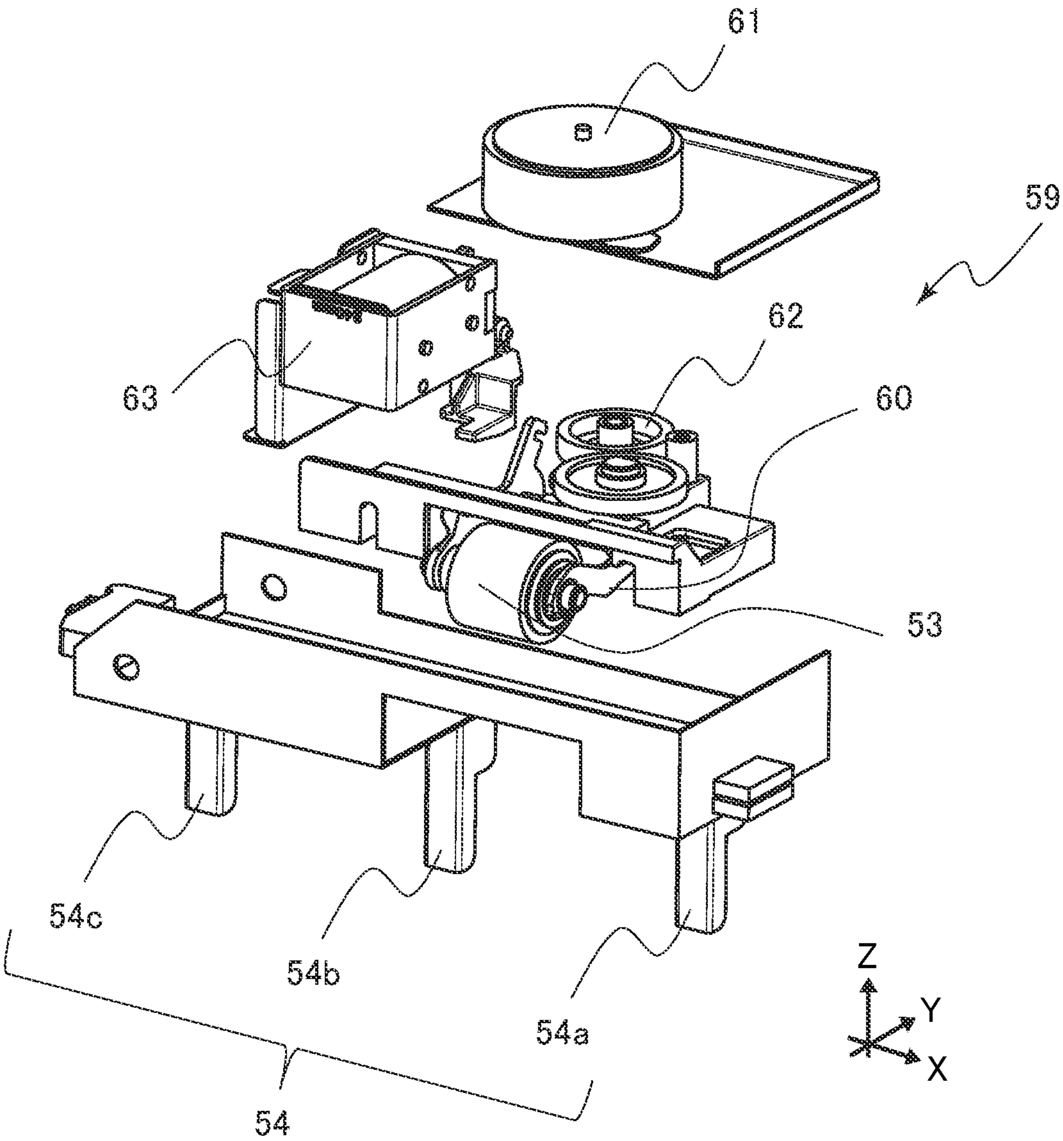
FIG. 6 is an exploded view of a movable unit of the alignment unit according to the embodiment.

Next, the configuration of the alignment unit 56 will be described using FIGS. 5 and 6. FIG. 5 is a cross-sectional view of the alignment unit 56 taken along a plane perpendicular to the X direction described below. FIG. 6 is an exploded view showing constituent elements of a movable unit 59 of the alignment unit 56.

In the following description, a direction parallel to the loading surface of the sheets in the alignment unit 56 and along the conveyance direction of the sheets conveyed from the kick-out roller 29 to the alignment unit 56 is referred to as the Y direction or the longitudinal direction. A direction parallel to the loading surface of the sheets in the alignment unit 56 and orthogonal to the Y direction is defined as the X direction or the lateral direction. The "longitudinal direction" is a direction along the sheet conveyance direction, and the "lateral direction" is a sheet width direction orthogonal to the sheet conveyance direction. A direction (the normal direction of the loading surface and the thickness direction of the loaded sheets) orthogonal to both the X direction and the Y direction is defined as the Z direction or the height direction. If necessary, directions opposite to the directions of the illustrated arrows representing the X, Y, and Z directions are referred to as the −X direction, the −Y direction, and the −Z direction.

As illustrated in FIG. 5, the alignment unit 56 includes an upper loading guide 51, a lower loading guide 52, a longitudinal reference plate 54, a longitudinal alignment roller 53, lateral reference plates 72*a* and 72*b* (see FIG. 7A), and a lateral alignment member 55. Further, the alignment unit 56 is provided with a stack pressing flag 50 (FIG. 1) that suppresses floating of the trailing edge of the sheet stack so that the leading edge of the succeeding sheet does not interfere with the trailing edge of the sheet stack already loaded on the lower loading guide 52.

The upper loading guide 51 and the lower loading guide 52 are arranged to face each other in the Z direction, and each spread in the X direction and the Y direction. A space in which a sheet stack is loaded is formed between the upper loading guide 51 and the lower loading guide 52. That is, the upper loading guide 51 and the lower loading guide 52 constitute an intermediate supporting portion 57 serving as a supporting portion into which a sheet stack to be subjected to bonding processing is loaded. The upper surface of the lower loading guide 52 constitutes a loading surface (a support surface for supporting the lower surface of the lowermost sheet) whereon the sheet stack is loaded.

The longitudinal reference plate 54 and the longitudinal alignment roller 53 function as a first alignment unit according to the present embodiment that aligns sheets in the first direction (Y direction).

The longitudinal reference plate 54 is disposed in the most downstream section of the intermediate supporting portion 57 in the Y direction. The longitudinal reference plate 54 is a reference member (first reference member) serving as a reference for the sheet position in the Y direction (first direction). The longitudinal alignment roller 53 is a conveyance member that conveys the sheets in the Y direction in order to align the sheets by causing the sheets to abut against the longitudinal reference plate 54. The longitudinal reference plate 54 includes a plurality of contact portions 54*a* to 54*c* arranged at intervals in the X direction (FIG. 6).

As illustrated in FIG. 6, the longitudinal reference plate 54 and the longitudinal alignment roller 53 are integrally configured as the movable unit 59, which is movable in the Y direction. The movable unit 59 can be moved in the Y direction relative to the intermediate supporting portion 57 by a driving unit (not illustrated). That is, the longitudinal reference plate 54 and the longitudinal alignment roller 53 are configured to be adjusted their positions in the Y direction according to the size of the sheets.

The longitudinal alignment roller 53 is rotatably supported by a roller holder 60. The roller holder 60 is attached to the frame of the movable unit 59 in a state of being swingable about a rotation fulcrum (not illustrated). Furthermore, the movable unit 59 is provided with a solenoid 63. When the solenoid 63 is energized, the roller holder 60 swings due to a link mechanism (not illustrated). The position of the longitudinal alignment roller 53 in the Z direction is changed by the swinging of the roller holder 60. As a result, the longitudinal alignment roller 53 is movable between a position (contact position) in which the longitudinal alignment roller 53 comes in contact with the upper surface of the sheet stack loaded in the intermediate supporting portion 57 and a position in which the longitudinal alignment roller 53 is retracted upward from the sheet stack. A motor 61 is attached to the movable unit 59. The motor 61 rotationally drives the longitudinal alignment roller 53 via a drive gear 62.

The lateral reference plates 72*a* and 72*b* and the lateral alignment member 55 function as a second alignment unit according to the present embodiment that aligns the sheets in a second direction (X direction) orthogonal to the first direction.

As illustrated in FIG. 5, the lateral alignment member 55 is coupled to the motor 58 via a drive train (not illustrated), and is configured to be movable in the X direction. The lateral alignment member 55 includes a plurality of pressing portions 55*a*, 55*b*, and 55*c* arranged at intervals in the Y direction. The pressing portions 55*a* to 55*c* are pressing surfaces that press the lateral edges (edges in the X direction) of the sheets loaded in the intermediate supporting portion 57. The lateral reference plates 72*a* and 72*b* (see FIG. 7A) serving as reference members (second reference members) serving as references of sheet positions (lateral position, width position) in the X direction (second direction) are arranged so as to face the pressing portions 55*a* to 55*c* of the lateral alignment member 55 in the X direction. The lateral reference plates 72*a* and 72*b* according to the present embodiment include a plurality of contact portions arranged at intervals in the Y direction.

Alignment Operation

An alignment operation in the alignment unit 56 will be described using FIGS. 7A to 7D. Each of FIGS. 7A to 7D illustrates constituent elements to be used for description among the constituent elements of the alignment unit 56 in a state where the alignment unit 56 is viewed from the Z direction side (from above). FIGS. 7A to 7D illustrate an aspect of the alignment operation when five sheets S1 to S5 stacked in advance by the buffer unit 20 are conveyed to the alignment unit 56.

Figure 7A:
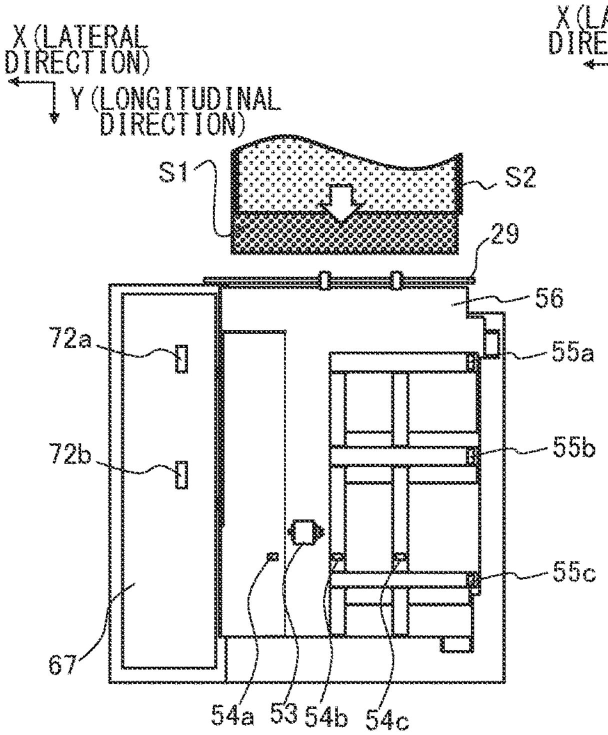
FIGS. 7A to 7D are diagrams to illustrate an alignment operation of the alignment unit according to the embodiment.

FIG. 7A illustrates an aspect in which the sheets S1 to S5 are conveyed toward the kick-out roller 29. The sheets S1 to S5 are conveyed to the alignment unit 56 in a state where the lower sheet protrudes further in the Y direction than the upper sheet. Before the sheets are stacked in the alignment unit 56, the position of the movable unit 59 is adjusted to a predetermined standby position in advance in accordance with the size of the sheets to be aligned. The standby position is set such that the position of the edge of the sheet in the −Y direction is constant regardless of the size of the sheet. In other words, the standby position is a position in which the distance in the Y direction from the nip position of the kick-out roller 29 to the contact portions 54*a* to 54*c* of the longitudinal reference plate 54 is slightly longer than the length of the sheet in the Y direction. Further, the lateral alignment member 55 stands by in a position spaced outward in the X direction from the sheet being conveyed so as not to hinder the conveyance of the sheet S.

Figure 7B:
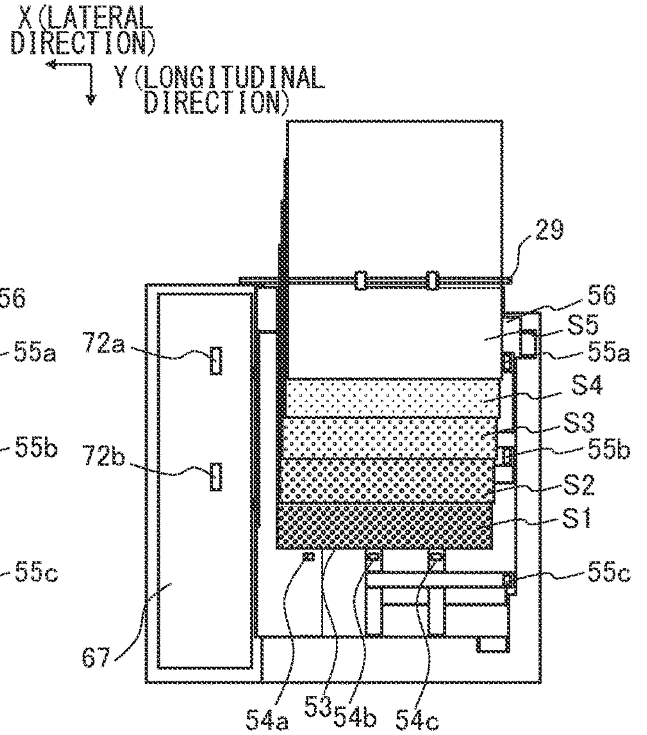

FIG. 7B shows an aspect when the trailing edge of the first sheet S1 passes through the nip of the kick-out roller 29 and the leading edge of the sheet S1 reaches the longitudinal alignment roller 53. The longitudinal alignment roller 53 is previously lowered to the contact position by energizing the solenoid 63, and is rotated by the motor 61 (FIG. 6). As a result, the sheet S1 abuts against the longitudinal reference plate 54 and is aligned with the position of the longitudinal reference plate 54 as a reference.

As the longitudinal alignment roller 53 continuously rotates, the second and subsequent sheets S2 to S5 that reach the longitudinal alignment roller 53 following sheet S1 sequentially abut against the longitudinal reference plate 54. Accordingly, the five sheets S1 to S5 are aligned in the Y direction (longitudinal direction) with the position of the longitudinal reference plate 54 as a reference.

Figure 7C:
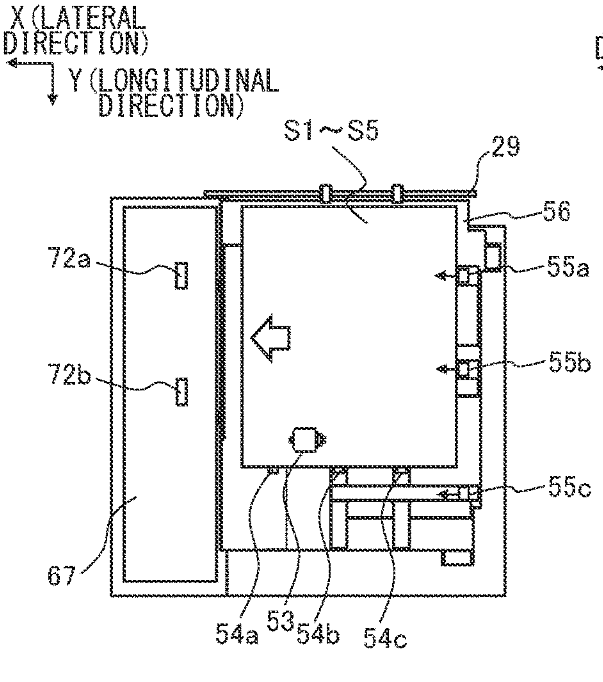

FIG. 7C shows an aspect when alignment in the X direction (lateral direction) is started after completion of alignment in the Y direction (longitudinal direction) of the sheets S1 to S5. The lateral alignment member 55 is driven by the motor 58 (FIG. 5) in the X direction, which is the alignment direction, and the pressing portions 55*a* to 55*c* contact the lateral edges of the sheets S1 to S5, thereby pressing the sheets S1 to S5 toward the lateral reference plates 72*a* and 72*b*. The other lateral edges of the sheets then contact the contact surfaces of the lateral reference plates 72*a* and 72*b*, and thus the sheets S1 to S5 are aligned in the X direction (lateral direction) with the positions of the lateral reference plates 72*a* and 72*b* as a reference.

Figure 7D:
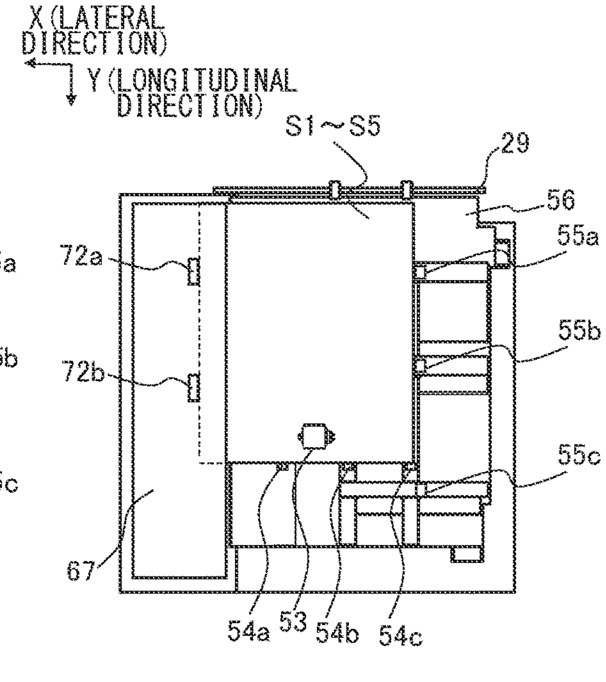

FIG. 7D illustrates a state in which the alignment of the five sheets S1 to S5 in the X direction and the Y direction is complete. The target position (alignment position) in the alignment operation is the position of the sheet stack when the bonding processing (heat and pressure bonding) by the heating and pressurizing unit 67 is performed. Therefore, in the image forming apparatus 1, the adhesive toner is applied to each sheet such that the side on which the layer 39 (FIG. 2) of the adhesive toner described above is formed is the side of the heating and pressurizing unit 67.

The sheets S1 to S5, for which the alignment shown in FIG. 7D is complete, are bonded by the heating and pressurizing unit 67. Meanwhile, the lateral alignment member 55 retracts in the −X direction. As a result, the alignment unit 56 can be ready to receive the next sheets.

Thereafter, the next sheets stacked in advance by the buffer unit 20 are loaded onto the sheets S1 to S5, which have been loaded in the intermediate supporting portion 57. Thus, the next sheets are aligned in the Y direction (longitudinal direction) and the X direction (lateral direction) by the same operation as described using FIGS. 7A to 7D, and after the alignment is complete, the heating and pressurizing unit 67 performs bonding processing.

Note that, although a case where the number of the plurality of sheets stacked in advance by the buffer unit 20 is five is exemplified here, the number of the plurality of sheets stacked by the buffer unit 20 is not limited to five, and may be, for example, two or three. The number of the plurality of sheets stacked in the buffer unit 20 need not be constant in one sheet stack. For example, five sheets may be stacked in the first stacking processing (buffer operation), and four sheets at a time may be stacked in subsequent stacking processings (buffer operations).

Heating and Pressurizing Unit

Figure 8:
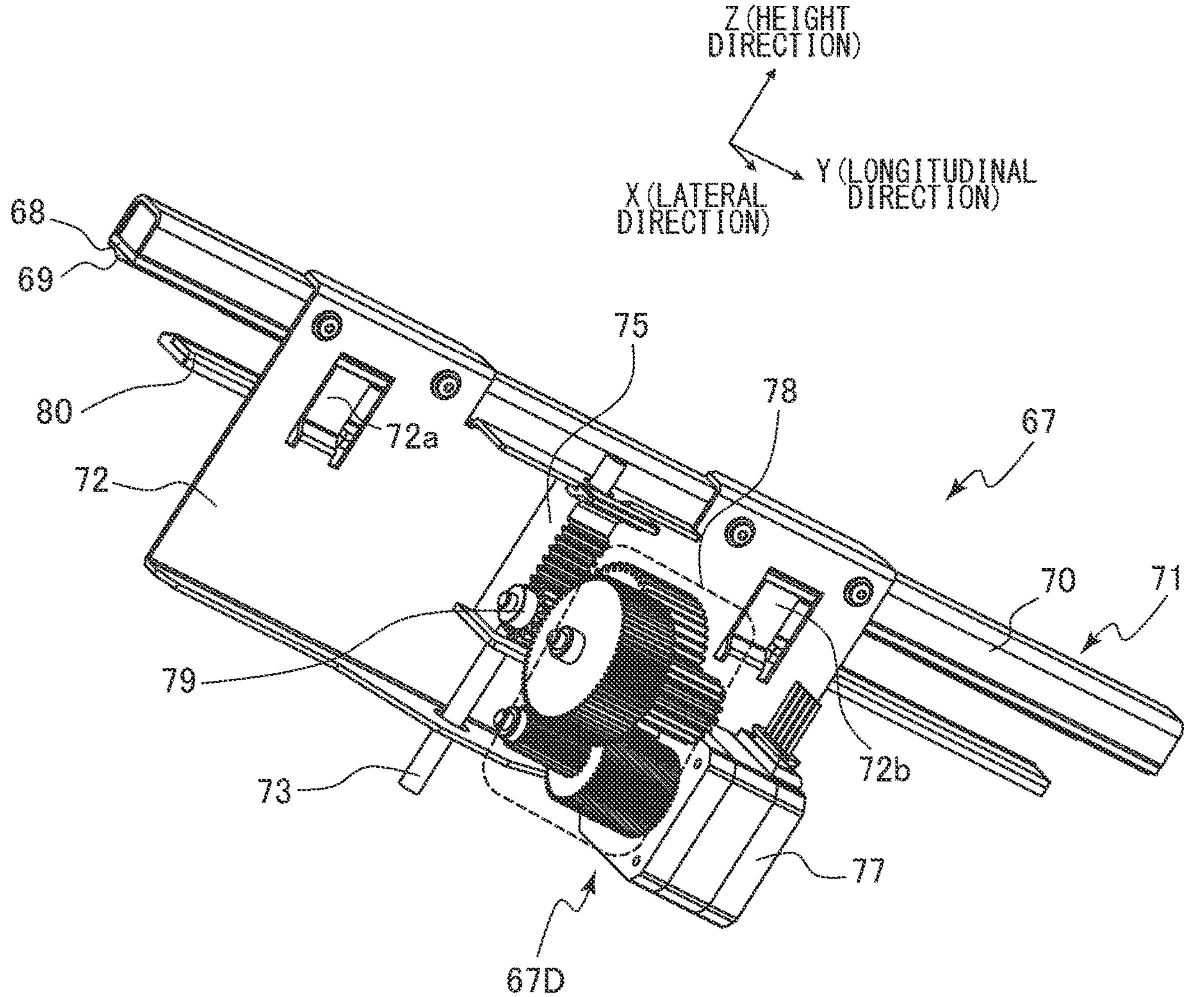
FIG. 8 is a perspective view of a heating and pressurizing unit according to the embodiment.

A configuration of a heating and pressurizing unit 67 (heat and pressure processing unit) serving as a bonding unit will be described using FIG. 8. FIG. 8 is a perspective view showing the heating and pressurizing unit 67 according to the present embodiment. The heating and pressurizing unit 67 includes a heater unit 71, a pressurizing mechanism 67D that pressurizes the heater unit 71, and a pressurizing plate 80 that undergoes or receives the pressurizing force of the heater unit 71.

The heater unit 71 includes a heating plate 69, a heater 68, and a metal stay 70. The heating plate 69 is an example of the heating member. The heating plate 69 is formed of, for example, aluminum as a material having high thermal conductivity. The heating plate 69 has a contact portion that contacts the uppermost sheet in order to heat and pressurize the sheet stack loaded in the intermediate supporting portion 57. The heater 68 is formed by, for example, forming a pattern of a heating resistor on a ceramic substrate. The heater 68 is disposed such that the heater 68 and the pressurizing plate 80 are arranged on opposite sides to each other with respect to the heating plate 69. The heating plate 69 is supported by the heater 68. The metal stay 70 supports the heater 68 and increases the stiffness of the heater unit 71. The heating plate 69, the heater 68, and the metal stay 70 are all members elongated in the Y direction.

A thermistor, for example, is attached to the heater unit 71 as a temperature detection unit. The control unit of the post-processing apparatus 6 monitors the temperature of the heater 68 based on a signal from the thermistor, and controls energization of the heater 68 such that the surface temperature of the heating plate 69 becomes a predetermined target temperature.

The pressurizing mechanism 67D includes a motor 77 serving as a drive source, a gear train 78, a pinion gear 79, a rack gear 75, and a lift plate 72. The gear train 78 functions as a speed reducer that increases torque by decelerating and transmitting the rotation outputted from the motor 77. The pinion gear 79 meshes with the rack gear 75. The pinion gear 79 and the rack gear 75 convert rotation received by the pinion gear 79 via the gear train 78 into linear motion in the Z direction. The rack gear 75 is fixed to the lift plate 72, and the lift plate 72 and the metal stay 70 of the heater unit 71 are fixed.

As described above, the heater unit 71 is configured to move (ascend and descend) in the Z direction and the −Z direction according to the forward rotation and the reverse rotation of the motor 77. During the bonding processing, the force in the −Z direction transmitted from the motor 77 to the lift plate 72 is transmitted to the heating plate 69 via the metal stay 70 and the heater 68, and the heating plate 69 is pressurized with respect to the sheet stack.

The pressurizing plate 80 is disposed to face the heating plate 69 of the heater unit 71 in the Z direction. The pressurizing plate 80 is, for example, a plate-like member made of silicone rubber. The pressurizing plate 80 is fixed to the frame of the post-processing apparatus 6, for example, by being fitted into the lower loading guide 52. Therefore, the pressurizing plate 80 is configured to stably undergo the pressurizing force with which the heater unit 71 presses the sheet stack and thus bring the sheet stack sandwiched between the heating plate 69 and the pressurizing plate 80 into a stable, pressurized state.

Note that the lateral reference plates 72*a* and 72*b* described above are formed integrally with the lift plate 72 according to the present embodiment. As a result, it is possible to reduce the number of parts and improve the alignment accuracy of the sheet stack with respect to the heater unit 71. Note that the lateral reference plates 72*a* and 72*b* can also be separate members from the lift plate 72. For example, the lateral reference plates 72*a* and 72*b* may be members fixed to the frame of the post-processing apparatus 6.

Bonding Operation

The bonding operation (heat and pressure bonding processing) of the sheet stack by the heating and pressurizing unit 67 will be described using FIGS. 9A to 9F and FIG. 10. FIGS. 9A to 9F and FIG. 10 each illustrate an aspect in which the heating and pressurizing unit 67 is viewed in the Y direction.

Figure 9A:
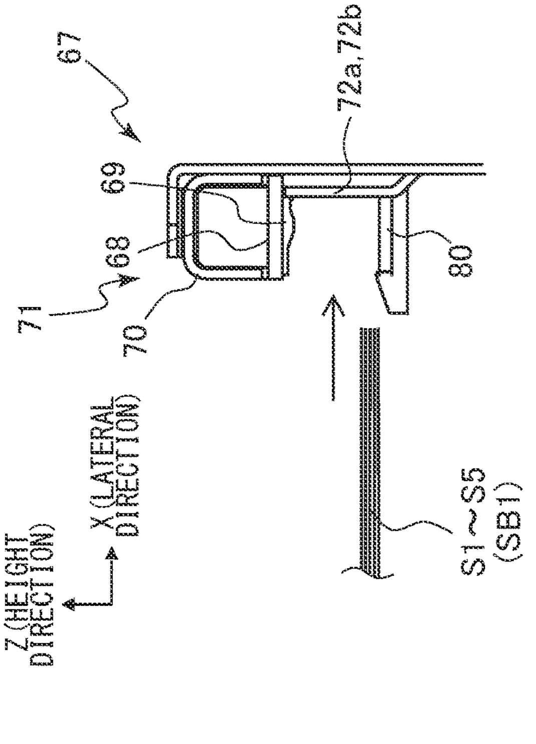
FIGS. 9A to 9F are cross-sectional views of the heating and pressurizing unit in order to describe a bonding operation according to the embodiment.

FIG. 9A illustrates the heating and pressurizing unit 67 at the same time point as FIG. 7C. That is, FIG. 9A illustrates an aspect in which alignment in the X direction is being performed after completion of alignment of the sheets S1 to S5 in the Y direction. Before completion of alignment of the sheets S1 to S5, the heater unit 71 waits in a position separate from the sheets S1 to S5 in the Z direction.

Figure 9B:
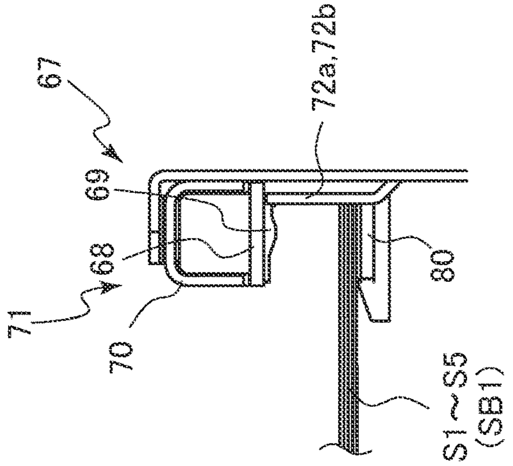

FIG. 9B illustrates the heating and pressurizing unit 67 at the same time point as FIG. 7D. That is, FIG. 9B shows a state in which the sheets S1 to S5 contact the lateral reference plates 72*a* and 72*b* so as to complete the alignment of the sheets S1 to S5 in the X direction. When the alignment of the sheets S1 to S5 is complete, the heater unit 71 starts to move (descend) in the −Z direction by the forward rotation drive of the motor 77.

Figure 9C:
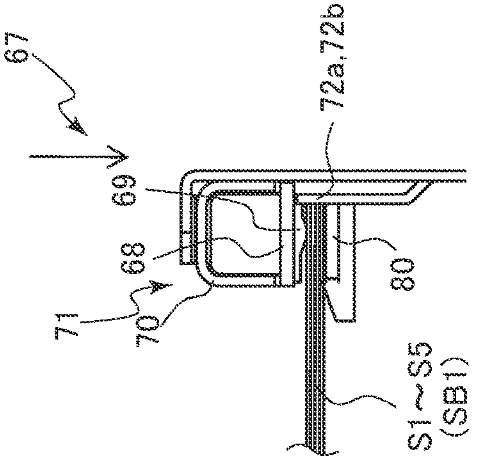

FIG. 9C shows an aspect when the heating plate 69 contacts the uppermost sheet S5 due to descent of the heater unit 71. The heater unit 71 is controlled such that the heating plate 69 pressurizes the sheet stack with a predetermined pressurizing force. Further, when the heating plate 69 comes into contact with the sheet S5, heat is transferred from the heater 68 to the sheets S1 to S5 via the heating plate 69, and the temperature of the adhesive toner applied to the sheets S1 to S5 starts to rise.

Heating and pressurization by the heating plate 69 are performed for a predetermined time such that the adhesive toner melts. As a result, the sheets S1 to S5 are bonded using the adhesive toner as an adhesive medium.

Figure 9D:
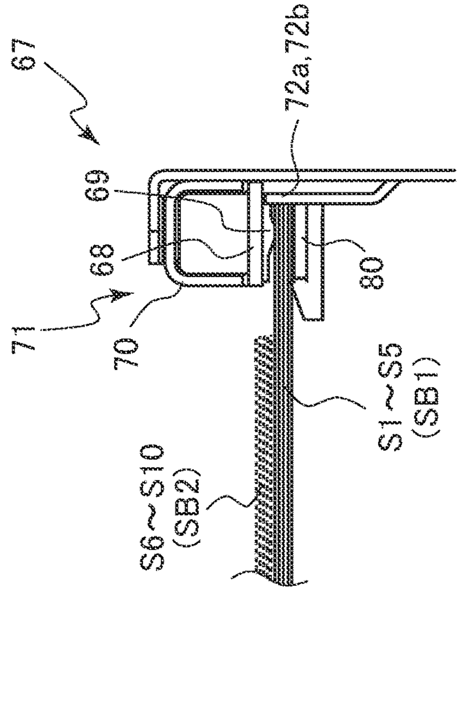

FIG. 9D shows an aspect when the next plurality of sheets S6 to S10 stacked by the buffer unit 20 is conveyed so as to be stacked on the sheets S1 to S5. According to the present embodiment, while the plurality of sheets S1 to S5 previously stacked in the buffer unit are treated with the heat and pressure processing (i.e., while the heating plate 69 is in contact with the sheet S5), the next plurality of sheets S6 to S10 can be carried into the alignment unit 56.

Figure 10:
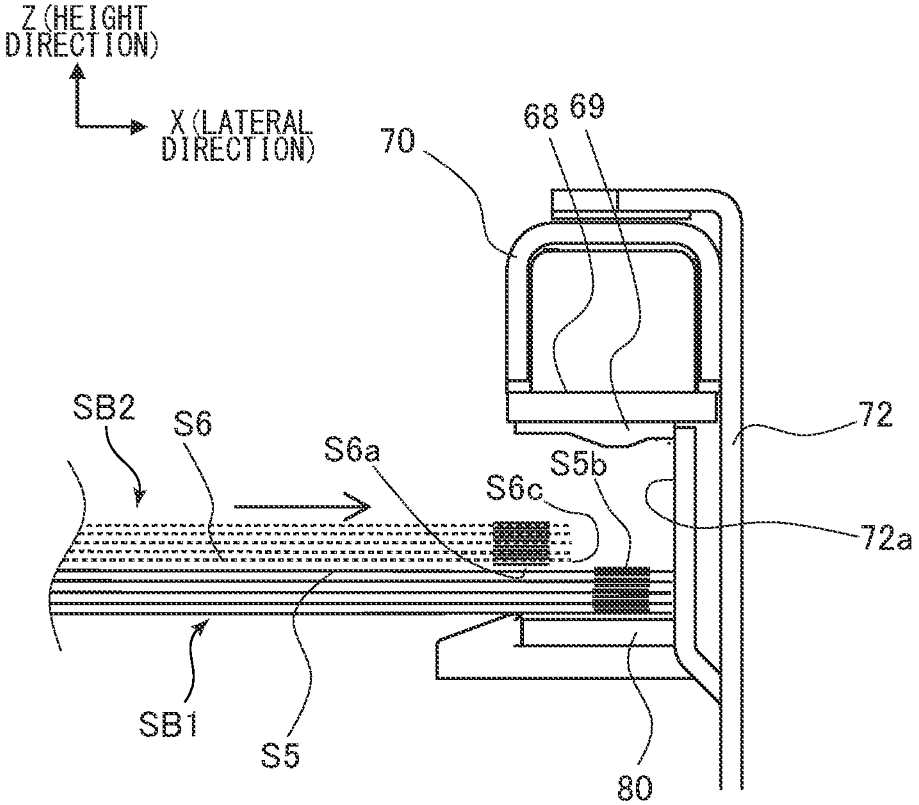
FIG. 10 is a cross-sectional view of the heating and pressurizing unit according to the embodiment.

FIG. 10 shows an aspect in which, after the heat and pressure bonding of the sheets S1 to S5 is complete, the heater unit 71 is moved (raised) in the Z direction by the reverse rotation drive of the motor 77, and the heating plate 69 is separate from the sheet S5. FIG. 10 shows an aspect in which the sheets S6 to S10 are in the middle of being aligned in the X direction after the heating plate 69 is raised to the predetermined standby position. An advantage of aligning the plurality of sheets S6 to S10 stacked in advance in the buffer unit 20 by the alignment unit 56 will be described below.

Figure 9E:
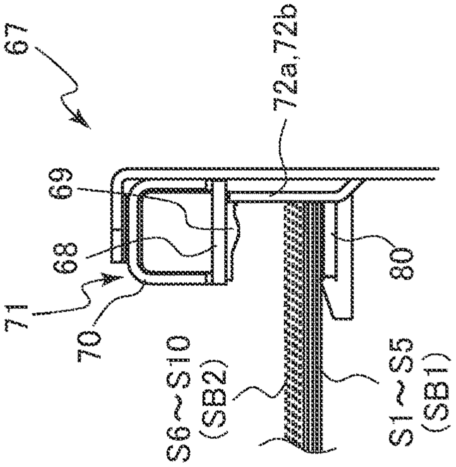

FIG. 9E illustrates a state in which the sheets S6 to S10 contact the lateral reference plates 72*a* and 72*b* and the alignment of the sheets S6 to S10 is complete.

Figure 9F:
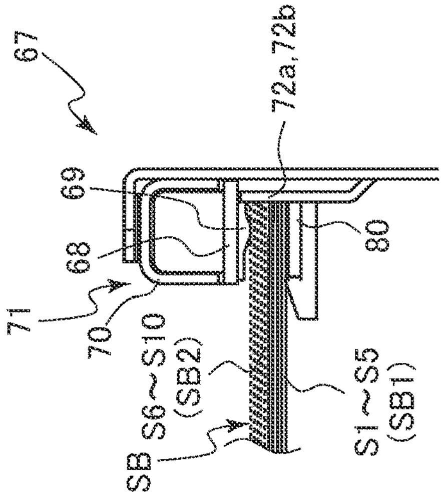

FIG. 9F shows an aspect when the heater unit 71 is moved (lowered) in the −Z direction again by the forward rotation drive of the motor 77, and the heating plate 69 contacts the topmost sheet S10. By heating and pressurization via the heating plate 69, the sheets S6 to S10 are bonded to each other with the adhesive toner. In addition, the plurality of sheets S1 to S5 (first sheet stack) previously carried into the alignment unit 56 and the plurality of sheets S6 to S10 (second sheet stack) subsequently carried into the alignment unit 56 are bonded to each other with the adhesive toner. This is because the adhesive toner is applied to the upper surface of the sheet S5 and the lower surface of the sheet S6. As a result, a sheet bundle SB which has more sheets than the maximum number of sheets that can be stacked by the buffer unit 20 is created.

When the bonding processing for all the sheets constituting one booklet is complete, the sheet bundle SB is discharged from the alignment unit 56 as a product. Specifically, as a result of the movable unit 59 (FIG. 5) moving in the −Y direction, the sheet bundle SB is pushed out toward the bundle discharge roller 36 by the longitudinal reference plate 54. Note that, in addition to the movable unit 59, a conveying mechanism for conveying the sheet bundle SB, for which the bonding process is complete, toward the bundle discharge roller 36 may be provided.

The bundle discharge roller 36 (FIG. 1) is configured such that an upper roller 36*a* is movable relative to a lower roller 36*b*, and is switched between a nipped state in which the sheet bundle SB can be nipped and an open state in which the upper roller 36*a* is upwardly separate from the lower roller 36*b*. In a case where the sheet bundle SB is discharged from the alignment unit 56, the bundle discharge roller 36 enters the open state in advance and stands by. When the leading edge of the sheet bundle SB reaches a position slightly beyond the bundle discharge roller 36, the movable unit 59 stops, and the bundle discharge roller 36 is switched to the nip state. Further, as a result of the bundle discharge roller 36 being rotationally driven, the sheet bundle SB is discharged to the lower discharge tray 37. On the other hand, the movable unit 59 moves in the Y direction after the sheet bundle SB is nipped by the bundle discharge roller 36 and returns to the standby position again.

Advantages Relative to Comparative Example

Here, advantages of the present embodiment will be described in comparison with the Comparative Example shown in FIG. 13. In this Comparative Example, unlike the present embodiment, in which a plurality of sheets stacked in advance in the buffer unit 20 is loaded into the alignment unit 56, sheets are aligned by being loaded one by one into the alignment unit 56. Other configurations and operations are common to the present embodiment.

Figure 13:
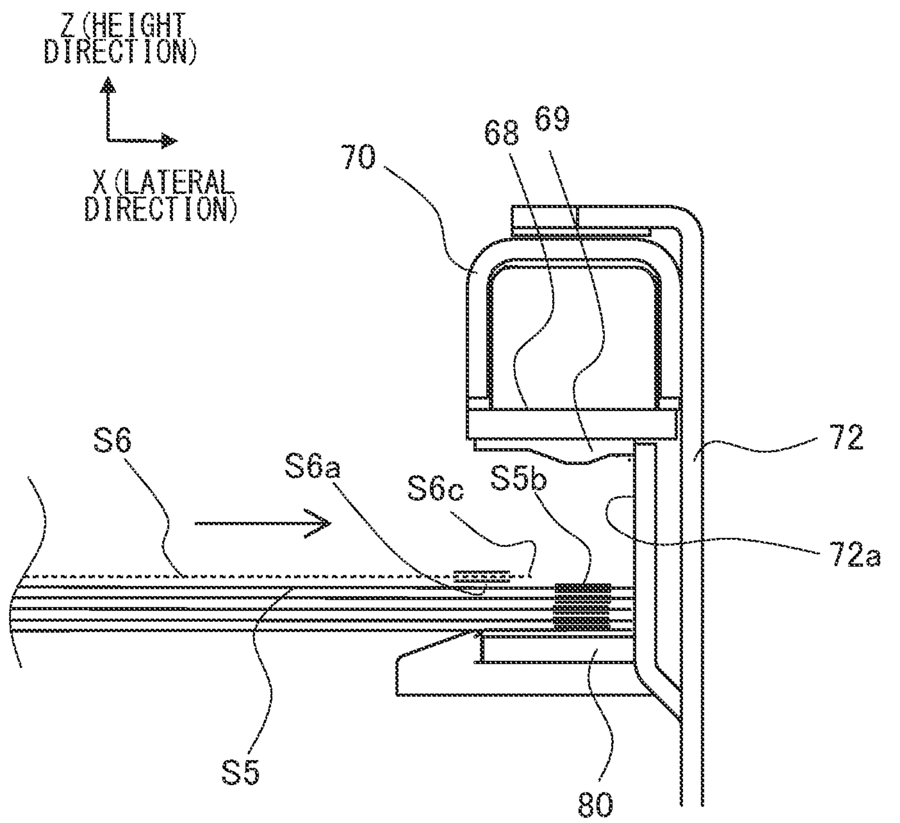
FIG. 13 is a cross-sectional view of a heating and pressurizing unit according to a Comparative Example.

FIG. 13 shows an aspect, according to the comparative example, in which the bonding processing of the sheets S1 to S5 is complete and alignment of the sixth sheet S6 in the X direction is being performed. Adhesive layer S5b is a layer of adhesive toner applied to the upper surface of the fifth sheet S5 (the upper surface in a state of being loaded in the intermediate supporting portion 57). Adhesive layer S6a is a layer of adhesive toner applied to the lower surface of the sixth sheet S6 (the lower surface in a state of being loaded in the intermediate supporting portion 57).

The time point represented by FIG. 13 is immediately after the bonding processing by the heating and pressurizing unit 67 is performed on the sheets S1 to S5, and represents a state in which the temperature of the adhesive layer S5b is high and the viscosity is high. Therefore, when the sixth sheet S6 is moved in the X direction toward the lateral reference plate 72*a*, the movement of the sheet S6 may be hindered by the adhesive force of the adhesive layer S5b, which is exposed at the surface of the sheet stack already subjected to bonding processing. For example, when leading edge S6c or the adhesive layer S6a in the movement direction (the X direction) of the sheet S6 comes into contact with the adhesive layer S5b, the movement of the sheet S6 is hindered. As a result, the leading edge S6c of the sheet S6 cannot reach the lateral reference plate 72*a*, and there is a possibility of misalignment (alignment failure) occurring between the sheet S6 and the sheets S1 to S5. In addition, in a case where the misalignment of the sheet S6 is severe, there is also the possibility of adhesion failure caused by to the misalignment.

In contrast, according to the present embodiment, as shown in FIG. 10, the plurality of sheets S6 to S10 (the second sheet stack) stacked in advance by the buffer unit 20 are collectively aligned in the X direction. Because the plurality of sheets S6 to S10 are stacked on one another, the substantial stiffness is higher than that of one sheet S6. Therefore, even if the leading edge S6c or the adhesive layer S6a comes into contact with the adhesive layer S5b, exposed on the surface of the sheet stack (first sheet stack) already loaded in the intermediate supporting portion 57, the movement of the sheet S6 is less likely to be hindered. That is, in the present embodiment, the alignment unit is configured to align the position of the second sheet stack with that of the first sheet stack in a state where the adhesive (S5b) is applied to the upper surface of the first sheet stack (S1 to S5) to be bonded to the lower surface of the second sheet stack (S6 to S10). Therefore, the sheets S6 to S10 can be more reliably brought into contact with the lateral reference plate 72*a*, thus reducing the possibility of misalignment of the sheets S1 to S10 occurring.

Further, after the sheets S6 to S10 are aligned in the Y direction (longitudinal alignment) by the longitudinal alignment roller 53 and the longitudinal reference plate 54 (the first alignment unit), alignment in the X direction (lateral alignment) is performed by the lateral alignment member 55 and the lateral reference plates 72*a* and 72*b* (the second alignment unit). As a result, it is possible to reduce the possibility of the alignment of the sheet S6 protruding by one sheet in the Y direction being hindered by the viscosity of the adhesive layers S5b and S6a.

As described above, the alignment unit according to the present embodiment aligns the position of the second sheet stack with the first sheet stack after the second sheet stack stacked in advance in the stacking unit is loaded onto the first sheet stack, which has been loaded in the supporting portion and aligned by the alignment unit. In addition, the bonding unit according to the present embodiment heats and pressurizes the second sheet stack aligned by the alignment unit, so that the sheets of the second sheet stack are bonded to each other with the adhesive and the first sheet stack and the second sheet stack are bonded to each other by the adhesive.

With this configuration, it is possible to improve the alignment during alignment of the next sheets on the sheets already loaded in the supporting portion.

Note that, after the first sheet stack and the second sheet stack are bonded to each other, the bonded sheet stack can be deemed as a new first sheet stack, and a sheet stack stacked in advance in the stacking unit can be deemed as a new second sheet stack. By repeating the same operation, it is possible to produce a product in which a large number of sheets are bonded.

First Modification

FIGS. 10 and 13 illustrate a configuration in which the adhesive toner is applied to both surfaces of each sheet except for the two sheets S1 and S10 located on the front and back surfaces (the front cover and the back cover) of one product (booklet). That is, a configuration in which the adhesive toner is applied to both sheet surfaces to be bonded is illustrated. Alternatively, the configuration may be such that the adhesive toner is applied to only one of the sheet surfaces to be bonded. For example, in the example of FIG. 10, the adhesive toner is applied to the lower surfaces of the sheets S2 to S10 excluding the lowermost sheet S1. This modification is an example of a configuration in which the alignment unit aligns the position of the second sheet stack with the first sheet stack in a state where the adhesive is applied to the lower surface of the second sheet stack (S6 to S10) to be bonded to the upper surface of the first sheet stack (S1 to S5). Note that the first embodiment is also said to be an example of the above configuration because the adhesive layer S6a is provided on the lower surface of the sheet S6.

As described above, even in a configuration in which the adhesive is applied to one surface of the sheet, there is a possibility of alignment failure occurring due to the resistance caused by the adhesive force of the adhesive layer S6a during alignment in the X direction. This is because the toner of the adhesive layer S6a is heated by the fixing processing in the image forming apparatus 1 and heated by the heat generated by the heating and pressurizing unit 67 and the sheets S1 to S5 in the binding processing unit 6A, and thus the viscosity is sometimes higher than that in the normal temperature state. Therefore, the possibility of alignment failure occurring can be reduced by the configuration according to the present embodiment in which a plurality of sheets stacked in advance by the buffer unit 20 are collectively aligned in comparison with the case where the sheets are aligned one by one as per FIG. 13.

Note that the configuration according to the present embodiment, in which the adhesive toner is applied to both sheet surfaces to be bonded, is advantageous in that it is easy to secure the bonding strength, regardless of the roughness or the like of the sheet surface, because the adhesive layer is thicker. However, it is conceivable to apply the present modification in a case where an adhesive (i.e., adhesive agent) capable of securing sufficient bonding strength even in single-sided application is used or in a case where the required bonding strength is low (in a case where a semi-adhesive product is produced, or similar). An advantage of the present modification is that, in the image forming apparatus 1, because image formation and application of the adhesive toner can be performed using a simplex printing operation, productivity can sometimes be improved.

Productivity Comparison

Figure 11:
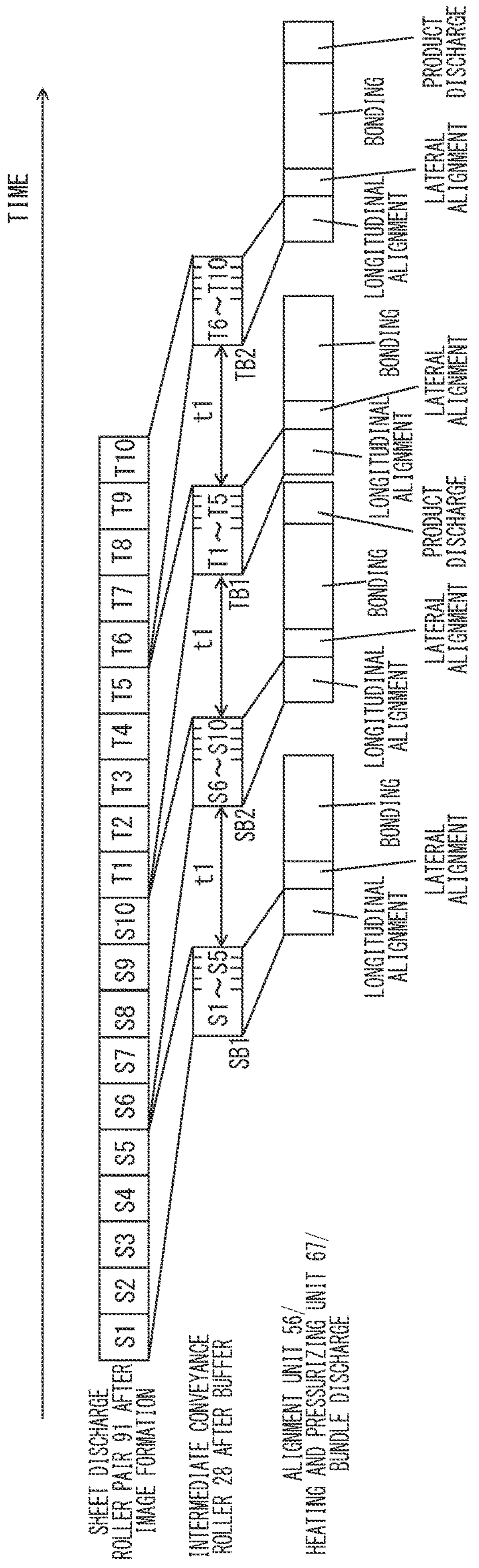
FIG. 11 is a time chart showing a time series during booklet manufacturing according to the embodiment.

As another advantage according to the present embodiment, productivity when producing a booklet will be described. FIG. 11 is a time chart illustrating the movement of the sheets S in a time series. Here, movement in the case of creating two booklets including ten sheets S1 to S10 and T1 to T10 will be described.

The upper section of FIG. 11 shows a period in which the sheet discharge roller pair 91 (FIG. 1) that discharges a sheet whereon an image has been formed from the apparatus body 1A of the image forming apparatus 1 discharges the sheets S1 to S10 and T1 to T10. The middle section shows a period in which the intermediate conveyance roller 28 (FIG. 1) that conveys the sheets between the buffer unit 20 and the alignment unit 56 conveys the sheets S1 to S10 and T1 to T10. The lower section shows a period in which the sheets S1 to S10 and T1 to T10 are aligned, bonded, and discharged in the binding processing unit 6A.

As shown in FIG. 11, the image-formed sheets S1 to S10 and T1 to T10 are discharged from the image forming apparatus 1 at substantially regular intervals (upper section). The buffer unit 20 sends out a plurality of sheets in a stacked state. Therefore, the intermediate conveyance roller 28 conveys four sets of sheet stacks SB1, SB2, TB1, and TB2, each including five unbonded sheets S1 to S5, S6 to S10, T1 to T5, and T6 to T10, to the binding processing unit 6A (middle section). In the binding processing unit 6A, the alignment operation in the longitudinal direction (Y direction), the alignment operation in the lateral direction (X direction), and the bonding processing by the heating and pressurizing unit 67 are performed in that order for each of the sheet stacks SB1, ST2, TB1, and TB2 (lower section). Further, when the production of the sheet bundle in which the ten sheets S1 to S10 and T1 to T10 are bonded to each other is complete, the sheet bundle is discharged from the binding processing unit 6A.

Here, the period in which the alignment, bonding, or discharge of the previous sheet stacks SB1, SB2, or TB1 is performed in the binding processing unit 6A and the period in which the stacking processing (the buffer operation) of the next sheet stacks SB2, TB1, or TB2 is performed in the buffer unit 20 overlap with each other. In other words, by interposing stacking processing (the buffer operation), in which a plurality of sheets are stacked in advance by the buffer unit 20, between the image forming process and the process of the binding processing unit 6A, it is possible to secure an interval t1 in which the sheets are carried into the alignment unit 56. The operation (alignment, bonding, discharge) in the binding processing unit 6A can be performed using the interval t1.

As a comparative example, a case is considered in which the sheets S1 to S10 are discharged one by one to the alignment unit 56 without the buffer operation by the buffer unit 20 being performed, and in which the heating and pressurizing unit 67 performs the bonding processing every time five sheets are loaded. In this case, the timing at which the fifth sheet S5 is carried into the alignment unit 56 and the completion timing of the first bonding processing can be substantially the same as those in the present embodiment. However, because the buffer operation by the buffer unit 20 is not performed, the productivity of the image forming system 1S decreases in a case where it is necessary to lower the productivity of the image forming apparatus 1 so that the next sheet is not carried into the alignment unit 56 during the bonding processing.

In contrast, the processing time of the binding processing unit 6A can be secured without increasing the discharge interval (image formation interval) of the sheets S1 to S10 and T1 to T10 in the image forming apparatus 1. That is, the sheets, which are conveyed one by one to the sheet processing apparatus, are stacked by the stacking unit every predetermined number of sheets and conveyed to the supporting portion, whereby succeeding sheets can be received at regular intervals even while the alignment by the alignment unit and the bonding by the bonding unit are performed on preceding sheets. As a result, the productivity (the number of copies of the booklet that can be created per unit time) of the image forming system 1S can be enhanced.

Second Modification

Figure 12:
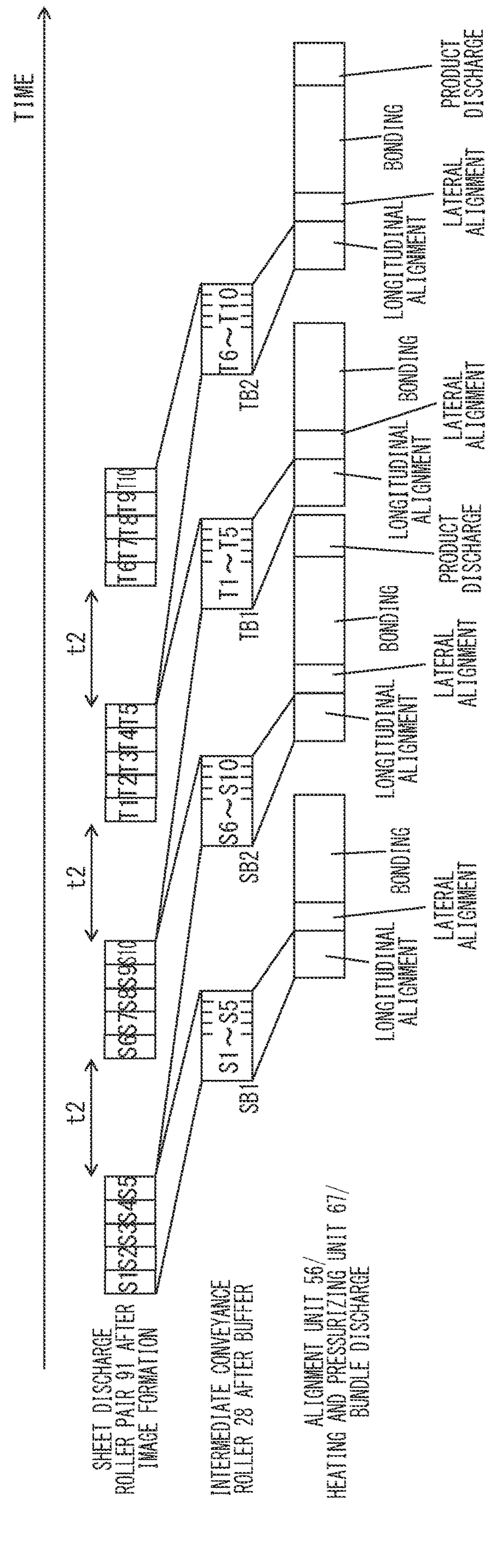
FIG. 12 is a time chart showing a time series during booklet manufacturing according to a modification.

In FIG. 11, it is assumed that the image forming apparatus 1 forms images at regular intervals. Alternatively, the productivity of the image forming apparatus 1 may be adjusted in accordance with the processing speed of the post-processing apparatus 6. For example, in a case where an image forming apparatus 1 having higher productivity (the number of image formation sheets per unit time) during image formation is used, as shown in FIG. 12, an interval of time t2 may be provided during image formation for each number of sheets to be stacked by the buffer unit 20 (here, every 5 sheets). As a result, it is possible to secure processing time for the alignment, bonding, and discharge in the binding processing unit 6A. In addition, even in the case of the present modification, because a plurality of sheets is stacked in advance by the buffer unit 20 and then conveyed to the alignment unit 56, the productivity of the image forming system 1S can be enhanced in comparison with a case where the sheets are conveyed one by one to the alignment unit 56.

Note that, in the embodiment and the modification described above, an example has been described in which, in a case where a booklet including ten sheets S1 to S10 is to be produced, sheets are stacked five at a time and the bonding processing is performed twice. The number of sheets to be stacked by the buffer unit 20 (the number of buffer sheet count) and the number of times bonding processing is performed are not limited to the foregoing. For example, in a case where a booklet including three sheets is to be produced, the booklet may be produced by using the buffer unit 20 to stack three sheets and performing one bonding processing. Furthermore, in a case where a booklet including 100 sheets is to be produced, the sheets may be stacked five at a time by the buffer unit 20 and conveyed to the alignment unit 56, and the heating and pressurizing unit 67 may perform the bonding processing twenty times. Further, in a case where a booklet including 80 sheets is to be produced, the buffer unit 20 may stack four sheets at a time and convey the sheets to the alignment unit 56, and the heating and pressurizing unit 67 may perform the bonding processing ten times, every eight sheets.

Third Modification

In the foregoing embodiment, as illustrated in FIG. 9D, it was described that the next sheet stack SB2 is carried into the alignment unit 56 while the bonding processing of the previous sheet stack SB1 is performed. Although FIG. 11 illustrates an example in which the alignment in the Y direction (longitudinal alignment) of the next sheet stack SB2 starts after the bonding processing of the previous sheet stack SB1, the bonding processing of the previous sheet stack SB1 and the alignment in the Y direction (longitudinal alignment) of the next sheet stack SB2 may be performed in parallel. That is, while the heating plate 69 of the heating and pressurizing unit 67 is in contact with the uppermost sheet (sheet S5) of the previous sheet stack SB1, the longitudinal alignment roller 53 may start to move the first sheet S6 of the next sheet stack SB2 in the Y direction. In the present embodiment, because the sheet stack SB2 is carried in and the alignment in the Y direction (longitudinal alignment) is performed in a position not interfering with the heating and pressurizing unit 67 in the X direction, the bonding processing of the previous sheet stack SB1 and the alignment in the Y direction (longitudinal alignment) of the next sheet stack SB2 can be performed in parallel.

As a result, the period in which the bonding processing is performed on the previous sheet stack SB1 and the period in which the alignment operation is performed on the next sheet stack SB2 can be made to overlap, thereby improving the productivity of the post-processing apparatus 6. Specifically, in a case where the interval t1 for conveying the sheet stacks from the buffer unit 20 to the alignment unit 56 can be made shorter than in the embodiment of FIG. 11, the one booklet can be completed earlier than according to the embodiment. In addition, in a case where the time required for the bonding processing is set longer than that of the embodiment, the booklet can be produced by the post-processing apparatus 6 without, as far as possible, reducing the productivity of the image forming apparatus 1.

Note that, in the embodiment described above, because the alignment in the Y direction (longitudinal alignment) with respect to the next sheet stack SB2 is started after the bonding processing with respect to the previous sheet stack SB1 (FIG. 11), the time from completion of the bonding processing to the start of the alignment in the X direction (lateral alignment) of the next sheet stack SB2 becomes long. Accordingly, there is an advantage that it is possible to secure a cooling time for the adhesive layer S5b until the next sheet stack SB2 reaches the adhesive layer S5b (FIG. 10) exposed at the upper surface of the previous sheet stack SB1. Therefore, for example, in a case where an adhesive toner which is highly viscous at a high temperature is used, it is sometimes advantageous in terms of alignment to start the alignment in the Y direction (longitudinal alignment) with respect to the next sheet stack SB2 after the bonding processing of the previous sheet stack SB1 is complete.

Other Modifications

In the embodiment described above, an image forming system 1S having a configuration (floor-standing type) in which the post-processing apparatus 6 is arranged on the same installation surface as the image forming apparatus 1 and is aligned with the image forming apparatus 1 is exemplified. The configuration of the image forming system is not limited thereto, and for example, the post-processing apparatus 6 may be installed on the image forming apparatus 1. The image forming system 1S may also include units other than the image forming apparatus 1 and the post-processing apparatus 6. Furthermore, the image forming system 1S may have a configuration in which the image forming unit, the buffer unit 20 according to the present embodiment, and the binding processing unit 6A are arranged in the same casing.

Furthermore, the “adhesive” in the present disclosure is not limited to the adhesive toner applied to the sheet by an electrophotographic process as long as the sheets can be bonded to each other by heating. For example, the image forming apparatus 1 may include an inkjet-type image forming unit, and an adhesive may be applied to a sheet together with ink for recording an image.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075406, filed on Apr. 28, 2022, which is hereby incorporated by reference herein in its entirety.

What is claimed is:

1. A sheet processing apparatus comprising:

a stacking unit configured to stack a plurality of sheets which are conveyed one by one in a state where an adhesive is applied thereto;

an alignment unit including a supporting portion on which the sheets are loaded, the alignment unit being configured to align positions of the sheets loaded on the supporting portion; and a bonding unit configured to bond the sheets loaded on the supporting portion to each other, wherein after a first sheet stack is loaded on the supporting portion and aligned by the alignment unit and then a second sheet stack stacked in advance in the stacking unit is loaded on the first sheet stack, the alignment unit is configured to align a position of the second sheet stack with the first sheet stack, and wherein the bonding unit is configured to heat and pressurize the second sheet stack aligned by the alignment unit such that sheets of the second sheet stack are bonded to each other with the adhesive and the first sheet stack and the second sheet stack are bonded to each other with the adhesive.

2. The sheet processing apparatus according to claim 1, wherein the alignment unit is configured to align the position of the second sheet stack with the first sheet stack in a state where the adhesive is applied to an upper surface of the first sheet stack to be bonded to a lower surface of the second sheet stack.

3. The sheet processing apparatus according to claim 1, wherein the alignment unit is configured to align the position of the second sheet stack with the first sheet stack in a state where the adhesive is applied to a lower surface of the second sheet stack to be bonded to an upper surface of the first sheet stack.

4. The sheet processing apparatus according to claim 1, wherein the alignment unit includes a first alignment unit that is configured to align the second sheet stack in a first direction, and a second alignment unit that is configured to align the second sheet stack in a second direction orthogonal to the first direction.

5. The sheet processing apparatus according to claim 4, wherein the bonding unit is configured to bond end portions of the sheets in the second direction, and wherein the second alignment unit is configured to align the second sheet stack by moving in the second direction after the second sheet stack is aligned by the first alignment unit.

6. The sheet processing apparatus according to claim 4, wherein the first alignment unit is configured to align the second sheet stack in a position in the second direction different from a bonding position in which the second sheet stack is to be bonded by the bonding unit, and wherein the first alignment unit is configured to start alignment of the second sheet stack during a period in which the first sheet stack is being bonded by the bonding unit.

7. The sheet processing apparatus according to claim 4, wherein the first alignment unit includes a conveyance member configured to convey a sheet toward a first reference member serving as a reference for a sheet position in the first direction, and is configured to align each sheet of the second sheet stack by using the conveyance member to abut each sheet of the second sheet stack against the first reference member.

8. The sheet processing apparatus according to claim 7, wherein the stacking unit is configured to stack the sheets in a shifting manner such that, in a state after the second sheet stack is loaded on the supporting portion and before the second sheet stack is aligned by the first alignment unit, a lower sheet in the second sheet stack protrudes further than an upper sheet in the second sheet stack toward the first reference member in the first direction.

9. The sheet processing apparatus according to claim 4, wherein the second alignment unit includes an alignment member that faces a second reference member serving as a reference for a sheet position in the second direction and that is configured to move in the second direction, and wherein the second alignment unit is configured to align the second sheet stack by using the alignment member to press and abut the second sheet stack against the second reference member.

10. The sheet processing apparatus according to claim 1, wherein the sheet processing apparatus is configured such that the second sheet stack is carried into the supporting portion during a period in which the first sheet stack is being bonded by the bonding unit.

11. The sheet processing apparatus according to claim 1, wherein the sheet processing apparatus is configured to receive succeeding sheets at regular intervals while preceding sheets are being aligned by the alignment unit and being bonded by the bonding unit, by using the stacking unit to stack the succeeding sheets conveyed one by one to the sheet processing apparatus for every predetermined number of sheets and then convey the stacked sheets to the supporting portion.

12. The sheet processing apparatus according to claim 11, wherein a period during which the alignment unit and the bonding unit aligns and bonds the first sheet stack overlaps with a period during which the stacking unit stacks a plurality of sheets to form the second sheet stack.

13. The sheet processing apparatus according to claim 1, wherein the stacking unit includes a first roller pair configured to convey a sheet, a second roller pair configured to convey a sheet, and a third roller pair configured to convey a sheet, wherein the third roller pair is arranged on a conveyance path that branches from a conveyance path extending from the first roller pair toward the second roller pair, and that extends toward the supporting portion, wherein the second roller pair and the third roller pair are each configured to convey a sheet in a first direction from the second roller pair toward the supporting portion and in a second direction opposite to the first direction, and wherein the stacking unit is configured to form a sheet stack by using the second roller pair and the third roller pair to move a preceding sheet reciprocally in the first direction and the second direction and by stacking a succeeding sheet conveyed via the first roller pair on the preceding sheet at the second roller pair.

14. The sheet processing apparatus according to claim 1, wherein the stacking unit is configured to form a sheet stack including three or more sheets.

15. The sheet processing apparatus according to claim 1, wherein the bonding unit includes a pressurizing plate configured to support end portions of sheets loaded on the supporting portion, a heating member that faces the pressurizing plate in a thickness direction of the sheets loaded on the supporting portion, a heater that is configured to generate heat by being energized and is disposed such that the heater and the pressurizing plate are arranged on opposite sides to each other with respect to the heating member in the thickness direction, and a pressurizing mechanism configured to move the heater and the heating member in the thickness direction relative to the pressurizing plate.

16. An image forming system, comprising:

an image forming unit configured to form an image on a sheet and apply a powder adhesive to the sheet; and the sheet processing apparatus according to claim 1.

17. The image forming system according to claim 16, further comprising a fixing unit configured to fix the image formed on the sheet and the powder adhesive to the sheet by heating the image and the powder adhesive.

18. The image forming system according to claim 16, wherein the image forming unit is configured to form images on both sides of a sheet, and wherein in a case where one product in which sheets are bonded by the bonding unit to each other is to be produced, the image forming unit is configured to apply the powder adhesive to both sides of each of the sheets constituting the product except two sheets to be a front surface and a back surface of the product.

* * * * *